United States Patent
Sannodo

(10) Patent No.: US 12,043,249 B2
(45) Date of Patent: Jul. 23, 2024

(54) REMOTE PARKING APPARATUS

(71) Applicant: TOYOTA JIDOSHA KABUSHIKI KAISHA, Toyota (JP)

(72) Inventor: Shinya Sannodo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 43 days.

(21) Appl. No.: 17/881,123

(22) Filed: Aug. 4, 2022

(65) Prior Publication Data

US 2023/0060130 A1    Mar. 2, 2023

(30) Foreign Application Priority Data

Sep. 2, 2021  (JP) ................. 2021-143247

(51) Int. Cl.
  *B60W 30/06*   (2006.01)
  *B60W 10/18*   (2012.01)
  *G05D 1/00*    (2024.01)

(52) U.S. Cl.
  CPC .......... *B60W 30/06* (2013.01); *B60W 10/182* (2013.01); *G05D 1/0011* (2013.01); *B60W 2510/182* (2013.01)

(58) Field of Classification Search
  CPC ............... B60W 30/06; B60W 10/182; B60W 2510/182; G05D 1/0011; G05D 2201/0212; G05D 2201/0213
  See application file for complete search history.

(56) References Cited

U.S. PATENT DOCUMENTS

| | | | |
|---|---|---|---|
| 11,427,186 B2* | 8/2022 | Hara | B60W 30/18109 |
| 2015/0032323 A1* | 1/2015 | Nijakowski | B60W 30/06 701/23 |
| 2016/0304087 A1* | 10/2016 | Noh | B60R 25/24 |
| 2016/0378104 A1* | 12/2016 | Hiei | B60Q 9/00 701/2 |
| 2017/0129537 A1* | 5/2017 | Kim | B62D 15/0285 |
| 2018/0029591 A1* | 2/2018 | Lavoie | B60W 50/14 |
| 2020/0361428 A1* | 11/2020 | Blumentritt | B60T 17/221 |
| 2021/0380078 A1* | 12/2021 | Plow | B60T 1/062 |

FOREIGN PATENT DOCUMENTS

DE   10 2015 209 976 B4   6/2019

* cited by examiner

*Primary Examiner* — Thomas D Alunkal
(74) *Attorney, Agent, or Firm* — Sughrue Mion, PLLC

(57) ABSTRACT

A remote parking apparatus executes a remote parking control to park the own vehicle in a designated parking space by controlling operations of the driving apparatus and the braking apparatus in response to commands from outside of the own vehicle. The remote parking apparatus executes a braking-drive process to apply the braking force to the own vehicle by the braking apparatus and apply the driving force to the own vehicle by the driving apparatus before starting to move the own vehicle by the remote parking control. The remote parking apparatus starts to move the own vehicle by the remote parking control on the condition that the own vehicle is maintained stopped until a predetermined time elapses from starting the braking-drive process.

8 Claims, 19 Drawing Sheets

REMOTE PARKING APPARATUS

CROSS-REFERENCE TO RELATED APPLICATIONS

This application claims priority to Japanese patent application No. JP 2021-143247 filed on Sep. 2, 2021, the content of which is hereby incorporated by reference in its entirety.

BACKGROUND

Field

The invention relates to a remote parking apparatus.

Description of the Related Art

There is known a remote parking apparatus which executes a remote parking control to park an own vehicle in a designated parking space by autonomously controlling a driving force and a braking force applied to the own vehicle in response to commands wirelessly from an operation terminal such as a portable terminal.

Further, if a braking apparatus of applying the braking force to the own vehicle has a malfunction, the braking apparatus cannot sufficiently brake the own vehicle during the remote parking control, for example, even when an obstacle on a course of the own vehicle is detected. Thus, there is also known a remote parking apparatus which executes a remote parking control to move the own vehicle only when it determines that the braking apparatus has no malfunction (for example, see DE 102015209976 B4). In particular, the known remote parking apparatus determines whether an electric system of supplying electric power to the braking apparatus has a malfunction before starting to move the own vehicle by the remote parking control.

As described above, the malfunction of the braking apparatus determined by the known remote parking apparatus is the malfunction of the electric system of supplying the electric power to the braking apparatus, and this malfunction is just one of the malfunctions which lead to malfunctions of the braking apparatus in its braking function for the own vehicle. Thus, even if the known remote parking apparatus determines that the braking apparatus has no malfunction in its braking function, the braking apparatus may have a malfunction in its braking function due to other causes. Thus, the malfunction of the braking apparatus in its braking function is desirably surely determined in terms of various causes before the own vehicle is moved by the remote parking control.

SUMMARY

An object of the invention is to provide a remote parking apparatus which can surely determine that the braking apparatus has no malfunction in its braking function before starting to move the own vehicle by the remote parking control.

According to the invention, a remote parking apparatus comprises a driving apparatus, a braking apparatus, and a vehicle electronic control unit. The driving apparatus applies a driving force to an own vehicle to move the own vehicle. The braking apparatus applies a braking force to the own vehicle to brake the own vehicle. The vehicle electronic control unit is configured to execute a remote parking control to park the own vehicle in a designated parking space by controlling operations of the driving apparatus and the braking apparatus in response to commands from outside of the own vehicle. Further, the vehicle electronic control unit is configured to, before the vehicle electronic control unit starts to move the own vehicle by the remote parking control, execute a braking-drive process to apply the braking force to the own vehicle by the braking apparatus and apply the driving force to the own vehicle by the driving apparatus. Furthermore, the vehicle electronic control unit is configured to, on the condition that the own vehicle is maintained stopped until a predetermined time elapses from starting the braking-drive process, start to move the own vehicle by the remote parking control.

With the remote parking apparatus according to the invention, on the condition that the own vehicle has been maintained stopped for the predetermined time from starting the braking-drive process, the own vehicle starts to be moved by the remote parking control. In other words, on the condition that the own vehicle is maintained stopped even when the braking-drive process is executed, the braking apparatus is determined to have no malfunction in its braking function for the own vehicle, and the own vehicle starts to be moved by the remote parking control. Thus, with the remote parking apparatus according to the invention, a malfunction of the braking apparatus in its braking function due to a malfunction of the electric system necessary to operate the braking apparatus can be determined. In addition, if the braking apparatus includes parts such that brake pads, a malfunction of the braking apparatus in its braking function due to wearing of the brake pads is difficult to determine. Also, a malfunction of the braking apparatus in its braking function due to overcharging of the own vehicle is difficult to determine. With the remote parking apparatus according to the invention, these malfunctions can be determined. Thus, whether the braking apparatus has a malfunction in its braking function can be surely determined before the own vehicle starts to be moved by the remote parking control.

According to an aspect of the invention, the remote parking apparatus may comprise a vehicle stopped state holding apparatus which holds the own vehicle stopped. In this aspect, the vehicle electronic control unit may be configured to, on the condition that the own vehicle is not maintained stopped and moves before the predetermined time elapses from starting the braking-drive process, hold the own vehicle stopped by the vehicle stopped state holding apparatus.

With the remote parking apparatus according to this aspect of the invention, on the condition that the own vehicle starts to be moved by the braking-drive process before the predetermined time elapses from starting the braking-drive process, the own vehicle is forcibly held stopped. In other words, on the condition that the stopped own vehicle starts to be moved by the braking-drive process before the predetermined time elapses from starting the braking-drive process, the braking apparatus is determined to have a malfunction in its braking function for the own vehicle, and the own vehicle is forcibly held stopped. Thus, the own vehicle cannot be moved by the remote parking control when the braking apparatus has a malfunction in its braking function for the own vehicle.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Figure 1:
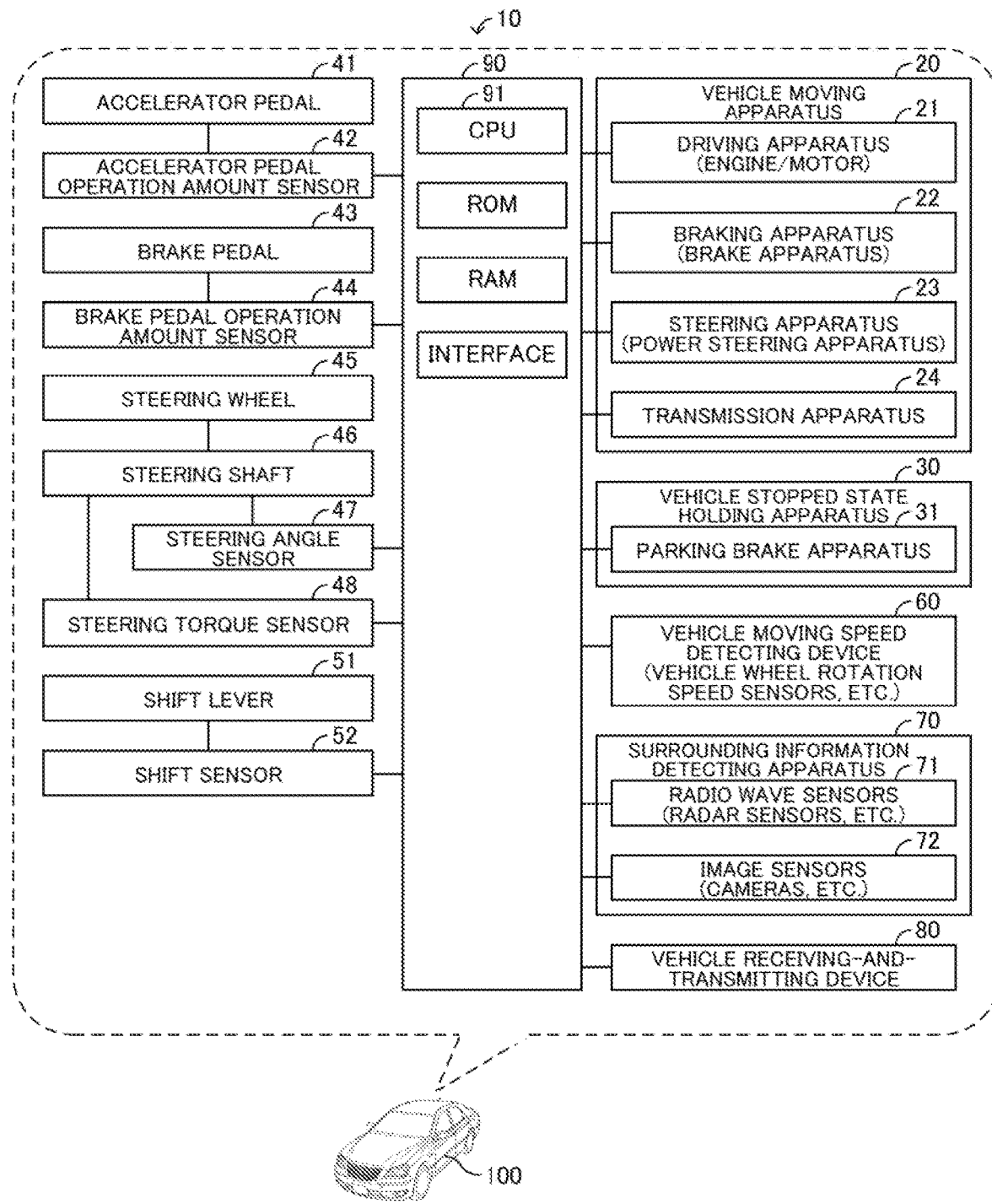
FIG. 1 is a view which shows a remote parking apparatus according to an embodiment of the invention and a vehicle or an own vehicle on which the remote parking apparatus is installed.

Below, a remote parking apparatus according to an embodiment of the invention will be described with reference to the drawings. As shown in FIG. 1, the remote parking apparatus 10 according to the embodiment of the invention is installed on a vehicle or an own vehicle 100.

The remote parking apparatus 10 executes a remote moving control including a remote parking control to park the own vehicle 100 in a designated space or a designated parking space by autonomously moving the own vehicle 100 and autonomously stopping the own vehicle 100 in the designated parking space in response to commands or command signals wirelessly transmitted from outside of the own vehicle 100. In this embodiment, in addition to the remote parking control (i.e., a remote pulling-in control), the remote moving control includes a remote pulling-out control to pull out the own vehicle 100 of the parking space by autonomously moving the own vehicle 100 and autonomously stopping the own vehicle at a designated place or a designated pulling-out place. Details of the remote pulling-out control will be described later.

Figure 2:
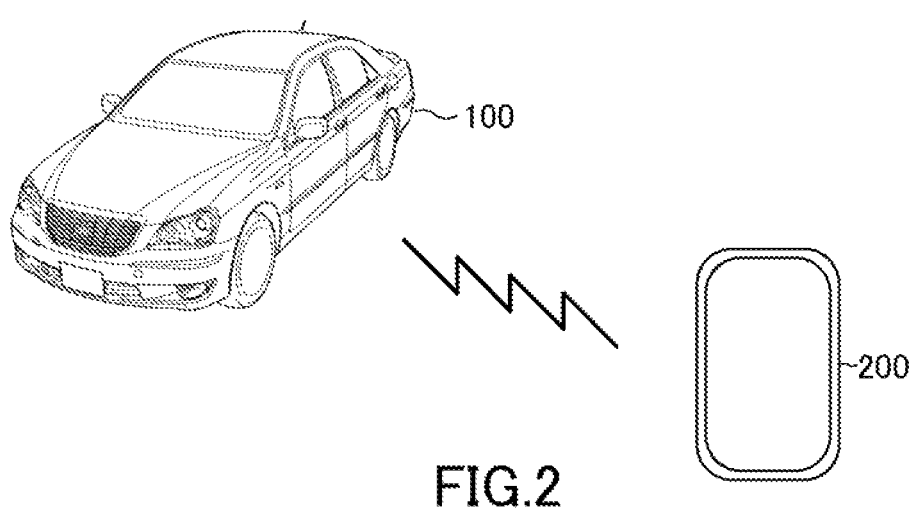
FIG. 2 is a view which shows a remote moving system which includes the remote parking apparatus according to the embodiment of the invention and an operation terminal according to the embodiment of the invention.

Further, as shown in FIG. 2, in this embodiment, the remote parking apparatus 10 receives commands or command signals wirelessly transmitted from an operation terminal 200 such as a portable phone to the outside thereof and executes the remote moving control including the remote parking control in response to the received commands.

As shown in FIG. 1, the remote parking apparatus 10 includes a vehicle ECU 90. The vehicle ECU 90 includes a micro-computer as a main component. The vehicle ECU 90 includes a CPU or a vehicle CPU 91, a ROM, a RAM, a non-volatile memory, and an interface. The vehicle CPU 91 is configured or programmed to realize various functions by executing instructions, programs, or routines memorized in the ROM. In particular, a program to execute the remote parking control and the remote pulling-out control is stored in the vehicle ECU 90.

<Vehicle Moving Apparatus>

A vehicle moving apparatus 20 is installed on the own vehicle 100. The vehicle moving apparatus 20 drives, brakes, and steers the own vehicle 100. In this embodiment, the vehicle moving apparatus 20 includes a driving apparatus 21, a braking apparatus 22, a steering apparatus 23, and a transmission apparatus 24.

<Driving Apparatus>

The driving apparatus 21 outputs a driving force to be applied to the own vehicle 100 to move the own vehicle 100. For example, the driving apparatus 21 may include an internal combustion engine and/or at least one electric motor The driving apparatus 21 is electrically connected to the vehicle ECU 90. The vehicle ECU 90 controls the driving force output from the driving apparatus 21 by controlling operations of the driving apparatus 21.

<Braking Apparatus>

The braking apparatus 22 outputs a braking force to be applied to the own vehicle 100 to brake the own vehicle 100. For example, the braking apparatus 22 may include a fluid brake apparatus. The braking apparatus 22 is electrically connected to the vehicle ECU 90. The vehicle ECU 90 controls the braking force output from the braking apparatus 22 by controlling operations of the braking apparatus 22.

<Steering Apparatus>

The steering apparatus 23 outputs a steering force to be applied to the own vehicle 100 to steer the own vehicle 100. For example, the steering apparatus 23 may include a power steering apparatus. The steering apparatus 23 is electrically connected to the vehicle ECU 90. The vehicle ECU 90 controls the steering force output from the steering apparatus 23 by controlling operations of the steering apparatus 23.

<Transmission Apparatus>

The transmission apparatus 24 transmits and stops transmitting the driving force from the driving apparatus 21 to driven wheels of the own vehicle 100. In addition, the transmission apparatus 24 transmits the driving force to the driven wheels so as to move the own vehicle 100 forward and rearward. In addition, the transmission apparatus 24 holds the own vehicle 100 stopped by locking a gear of the transmission apparatus 24 by engaging a pawl part or a parking lock pawl with the gear to prevent the gear from rotating. Thus, the transmission apparatus 24 also functions as a vehicle stopped state holding apparatus which holds the own vehicle 100 stopped.

The transmission apparatus 24 operates n any one of a drive range state SD to transmit the driving force to the driven wheels to move the own vehicle 100 forward, a rearward range state SR to transmit the driving force to the driven wheels to move the own vehicle 100 rearward, a neutral range state SN to stop transmitting the driving force to the driven wheels of the own vehicle 100, and a parking range state SP to hold the own vehicle 100 stopped.

The transmission apparatus 24 is electrically connected to the vehicle ECU 90. The vehicle ECU 90 sets the transmission apparatus 24 in any one of the drive range state SD, the rearward range state SR, the neutral range state SN, and the parking range state SP by controlling operations of the transmission apparatus 24.

<Vehicle Stopped State Holding Apparatus>

Further, a vehicle stopped state holding apparatus 30 is installed on the own vehicle 100. The vehicle stopped state holding apparatus 30 holds the own vehicle 100 stopped. In this embodiment, the vehicle stopped state holding apparatus 30 may include a parking brake apparatus 31. The parking brake apparatus 31 may be an electric parking brake apparatus or a manual parking brake apparatus. The parking brake apparatus 31 holds the own vehicle 100 stopped by applying the braking force to wheels of the stopped own vehicle 100. In particular, the parking brake apparatus 31 holds the own vehicle 100 stopped by pressing brake pads onto brake discs provided on the wheels of the own vehicle 100, respectively to apply the braking force to the wheels of the stopped own vehicle 100. In this embodiment, the parking brake apparatus 31 is the electric parking brake apparatus. Thus, the parking brake apparatus 31 is electrically connected to the vehicle ECU 90. The vehicle ECU 90 holds the own vehicle 100 stopped by controlling operations of the parking brake apparatus 31.

<Sensors, Etc.>

Furthermore, an accelerator pedal 41, an accelerator pedal operation amount sensor 42, a brake pedal 43, a brake pedal operation amount sensor 44, a steering wheel 45, a steering shaft 46, a steering angle sensor 47, a steering torque sensor 48, a shift lever 51, a shift sensor 52, a vehicle moving speed detecting device 60, a surrounding information detecting apparatus 70, and a vehicle receiving-and-transmitting device 80 are installed on the own vehicle 100.

<Accelerator Pedal Operation Amount Sensor>

The accelerator pedal operation amount sensor 42 detects an operation amount of the accelerator pedal 41. The accelerator pedal operation amount sensor 42 is electrically connected to the vehicle ECU 90. The accelerator pedal operation amount sensor 42 sends information on the detected operation amount of the accelerator pedal 41 to the vehicle ECU 90. The vehicle ECU 90 acquires the operation amount of the accelerator pedal 41 as an accelerator pedal operation amount AP, based on the information sent from the accelerator pedal operation amount sensor 42.

The vehicle ECU 90 calculates and acquires a required driving force or a required driving torque, based on the accelerator pedal operation amount AP and a moving speed of the own vehicle 100 or an own vehicle moving speed except when the vehicle ECU 90 executes the remote parking control or the remote pulling-out control described later in detail. The vehicle ECU 90 controls the operations of the driving apparatus 21 so as to output the driving force corresponding to the required driving force. When the vehicle ECU 90 executes the remote parking control or the remote pulling-out control described later in detail, the vehicle ECU 90 determines the driving force necessary to move the own vehicle 100 in a desired manner by the remote parking control or the remote pulling-out control and controls the operations of the driving apparatus 21 so as to output the determined driving force.

<Brake Pedal Operation Amount Sensor>

The brake pedal operation t sensor 44 detects an operation amount of the brake pedal 43. The brake pedal operation amount sensor 44 is electrically connected to the vehicle ECU 90. The brake pedal operation amount sensor 44 sends information on the detected operation amount of the brake pedal 43 to the vehicle ECU 90. The vehicle ECU 90 acquires the operation amount of the brake pedal 43 as a brake pedal operation amount BP, based on the information sent from the brake pedal operation amount sensor 44.

The vehicle ECU 90 calculates and acquires a required braking force or a required braking torque, based on the brake pedal operation amount BP except when the vehicle ECU 90 executes the remote parking control or the remote pulling-out control described later in detail. The vehicle ECU 90 controls the operations of the braking apparatus 22 so as to output the braking force corresponding to the required braking force. When the vehicle ECU 90 executes the remote parking control or the remote pulling-out control described later in detail, the vehicle ECU 90 determines the braking force necessary to brake the own vehicle 100 in a desired manner by the remote parking control or the remote pulling-out control and controls the operations of the braking apparatus 22 so as to output the determined braking force.

<Steering Angle Sensor>

The steering angle sensor 47 detects a rotation angle of the steering shaft 46 with respect to a neutral position thereof. The steering angle sensor 47 is electrically connected to the vehicle ECU 90. The steering angle sensor 47 sends information on the detected rotation angle of the steering shaft 46 to the vehicle ECU 90. The vehicle ECU 90 acquires the rotation angle of the steering shaft 46 as a steering angle $\theta$, based on the information sent from the steering angle sensor 47.

<Steering Torque Sensor>

The steering torque sensor 48 detects a torque which a driver DR of the own vehicle 100 inputs to the steering shaft 46 via the steering wheel 45. The steering torque sensor 48 is electrically connected to the vehicle ECU 90. The steering torque sensor 48 sends information on the detected torque to the vehicle ECU 90. The vehicle ECU 90 acquires the torque which the driver DR inputs to the steering shaft 46 via the steering wheel 45 as a driver input torque, based on the information sent from the steering torque sensor 48.

The vehicle ECU 90 acquires a required steering force or a required steering torque, based on the steering angle $\theta$, the driver input torque, and the moving speed of the own vehicle 100, i.e., the own vehicle moving speed except when the vehicle ECU 90 executes the remote parking control or the remote pulling-out control described later in detail. The vehicle ECU 90 controls the operations of the steering apparatus 23 so as to output the steering torque corresponding to the required steering torque. When the vehicle ECU 90 executes the remote parking control or the remote pulling-out control described later in detail, the vehicle ECU 90 determines the steering force necessary to move the own vehicle 100 in a desired manner by the remote parking control or the remote pulling-out control and controls the operations of the steering apparatus 23 so as to output the determined steering force.

<Shift Sensor>

The shift sensor 52 detects a set position of the shift lever 51. The shift lever 51 is a device operated by the driver DR of the own vehicle 100. The set position of the shift lever 51 which the driver DR can set includes a forward moving position (or a drive range D), a rearward moving position (or a rearward range R), a neutral position (or a neutral range N), and a parking position (or a parking range P) The shift sensor 52 is electrically connected to the vehicle ECU 90. The shift sensor 52 sends a signal representing the detected set position of the shift lever 51 to the vehicle ECU 90.

When the shift lever 51 is set at the drive range D, the shift sensor 52 sends the signal representing that the set position of the shift lever 51 corresponds to the drive range to the vehicle ECU 90. When the vehicle ECU 90 receives the signal in question, the vehicle ECU 90 controls the operations of the transmission apparatus 24 to set the transmission apparatus 24 in the drive range state SD.

When the shift lever 51 is set at the rearward range R, the shift sensor 52 sends the signal representing that the set position of the shift lever 51 corresponds to the rearward range R to the vehicle ECU 90. When the vehicle ECU 90 receives the signal in question, the vehicle ECU 90 controls the operations of the transmission apparatus 24 to set the transmission apparatus 24 in the rearward range state SR.

When the shift lever 51 is set at the neutral range N, the shift sensor 52 sends the signal representing that the set position of the shift lever 51 corresponds to the neutral range N to the vehicle ECU 90. When the vehicle ECU 90 receives the signal in question, the vehicle ECU 90 controls the operations of the transmission apparatus 24 to set the transmission apparatus 24 in the neutral range state SN.

When the shift lever 51 is set at the parking range P, the shift sensor 52 sends the signal representing that the set position of the shift lever 51 corresponds to the parking range P to the vehicle ECU 90. When the vehicle ECU 90 receives the signal in question, the vehicle ECU 90 controls the operations of the transmission apparatus 24 to set the transmission apparatus 24 in the parking range state SR <Vehicle Moving Speed Detecting Device>

The vehicle moving speed detecting device 60 detects the moving speed of the own vehicle 100. For example, the vehicle moving speed detecting device 60 may include vehicle wheel rotation speed sensors. The vehicle moving speed detecting device 60 is electrically connected to the vehicle ECU 90. The vehicle moving speed detecting device 60 sends information on the detected moving speed of the own vehicle 100 to the vehicle ECU 90. The vehicle ECU 90 acquires the moving speed of the own vehicle 100 as an own vehicle moving speed V, based on the information sent from the vehicle moving speed detecting device 60.

<Surrounding information Detecting Apparatus>

The surrounding information detecting apparatus 70 detects information around the own vehicle 100. In this embodiment, the surrounding information detecting apparatus 70 includes radio wave sensors 71 and image sensors 72.

<Radio Wave Sensors>

The radio wave sensor 71 detects information on objects around the own vehicle 100 by using radio waves. For example, the radio wave sensor 71 ray be a radar sensor such as a millimeter wave radar, a sonic wave sensor such as an ultrasonic sensor such as a clearance sonar, or an optical sensor such as a laser radar such as LiDAR. The radio wave sensors 71 are electrically connected to the vehicle ECU 90. The radio wave sensor 71 transmits radio waves and receives the radio waves reflected on the objects, i.e., receives the reflected radio waves. The radio wave sensor 71 sends information on the transmitted radio waves and the received radio waves, i.e., the reflected radio waves to the vehicle ECU 90, in other words, the radio wave sensor 71 detects the objects around the own vehicle 100 and sends information on the detected objects to the vehicle ECU 90. The vehicle ECU 90 acquires surrounding detection information IS on the objects around the own vehicle 100, based on the information or radio wave information IR sent from the radio wave sensors 71. For example, the objects detected by the radio wave sensors 71 may be vehicles, walls, bicycles, and persons.

<Image Sensors>

The image sensor 72 takes images of a view around the own vehicle 100. For example, the image sensor 72 may be a camera. The image sensors 72 are electrically connected to the vehicle ECU 90. The image sensor 72 takes the images of the view around the own vehicle 100 and sends information on the taken images to the vehicle ECU 90. The vehicle ECU 90 acquires the surrounding detection information IS on a situation around the own vehicle 100, based on the information or camera image information IC sent from the image sensors 72, <Vehicle Transmitting-and-Receiving Device>

The vehicle receiving-and-transmitting device 80 receives wireless signals coming from the outside of the own vehicle 100 and transmits wireless signals to the outside of the own vehicle 100. The vehicle receiving-and-transmitting device 80 is electrically connected to the vehicle ECU 90. The vehicle ECU 90 transmits various signals to the outside of the own vehicle 100 via the vehicle receiving-and-transmitting device 80. In addition, a terminal ECU 290 described later in detail transmits various signals to the outside of the operation terminal 200 via a terminal receiving-and-transmitting device 280 described later in detail, and the vehicle ECU 90 receives the various signals in question via the vehicle receiving-and-transmitting device 80.

<Operation Terminal>

In this embodiment, the operation terminal 200 is a so-called smart phone which a person can carry. In this regard, the operation terminal 200 may be a terminal which is separated from the own vehicle 100 and a user of the own vehicle 100 can carry. For example, the operation terminal 200 may be a so-called smart key or a terminal dedicated to a remote parking.

Figure 3:
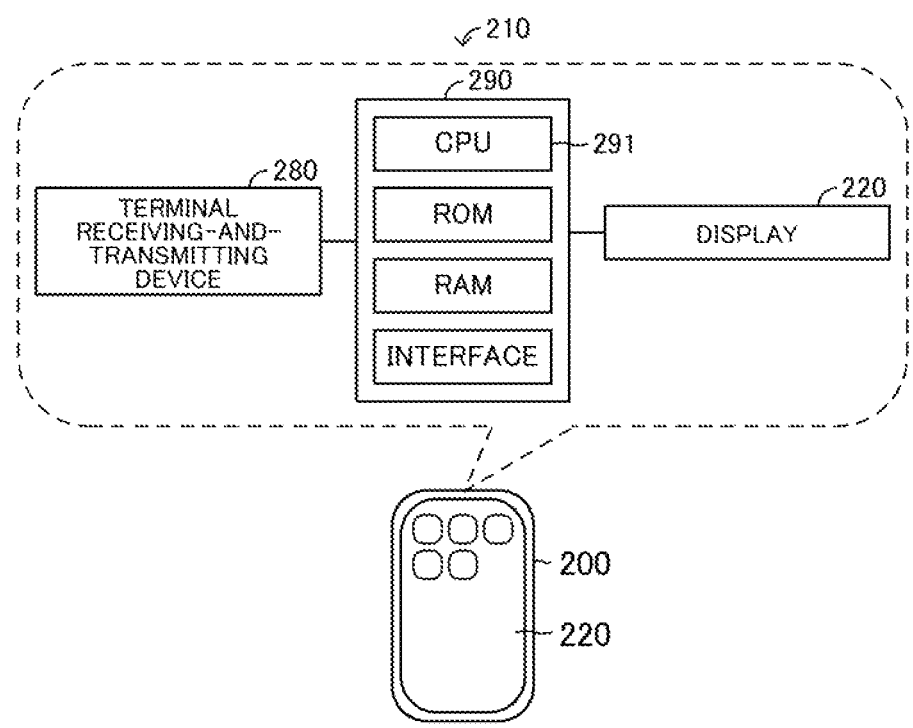
FIG. 3 is a view which shows a remote control apparatus according to the embodiment of the invention and the operation terminal on which the remote control apparatus is installed.

As shown in FIG. 3, a remote control apparatus 210 is installed in the operation terminal 200. The remote control apparatus 210 includes a terminal ECU 290.

ECU stands for electronic control unit. The terminal ECU 290 includes a micro-computer as a main component. The terminal ECU 290 includes a CPU or a terminal CPU 291, a ROM, a RAM, a non-volatile memory, and an interface. The terminal CPU 291 is configured or programmed to realize various functions by executing instructions, programs, or routines memorized in the ROM. In particular, a remote moving application software or a remote moving app to cause the vehicle ECU 90 of the own vehicle 100 to execute the remote moving control described later in detail is stored in the terminal ECU 290.

Further, the operation terminal 200 includes a display 220 and a terminal receiving-and-transmitting device 280.

The display 220 displays various images. The display 220 has a property which changes in response to an object contacting the display 220. In particular, in this embodiment, the display 220 has a physical property which changes in response to an object contacting the display 220.

The display 220 is electrically connected to the terminal ECU 290. The terminal ECU 290 can display various images on the display 220. In addition, the terminal ECU 290 detects a change of the property of the display 220 in response to an object contacting the display 220 and specifies a portion of the display 220 or a position on the display 220 which the object contacts, based on the detected change of the property of the display 220.

It should be noted that as described above, the terminal ECU 290 specifies the portion of the display 220 which the object contacts, based on the change of the certain property of the display 220 and thus, the display 220 is a contact information providing device which provides information to specify the portion of the display 220 which the object contacts. In this embodiment, the contact information providing device is the display 220. However, the contact information providing device is not limited to the display 220. Any device may be used as far as it provides the information to specify the portion which the object contacts. For example, a device not including a function of displaying images may be used as far as it provides the information to specify the portion which the object contacts.

The terminal receiving-and-transmitting device 280 receives wireless signals coming from the outside of the operation terminal 200 and transmits wireless signals to the outside of the operation terminal 200. The terminal receiving-and-transmitting device 280 is electrically connected to the terminal ECU 290. The terminal ECU 290 transmits various signals to the outside of the operation terminal 200 via the terminal receiving-and-transmitting device 280. In addition, the vehicle ECU 90 of the own vehicle 100 transmits various signals to the outside of the own vehicle 100 via the vehicle receiving-and-transmitting device 80, and the terminal ECU 290 receives the various signals in question via the terminal receiving-and-transmitting device 280.

<Summary of Operations of Remote Parking Apparatus>

Next, a summary of operations of the remote parking apparatus 10 will be described. As described above, the remote parking apparatus 10 is configured to execute the remote parking control and the remote pulling-out control. First, the remote parking control will be described.

When a predetermined touch interaction for activating the remote moving app is applied to the display 220 of the operation terminal 200, the terminal ECU 290 activates the remote moving app and displays a predetermined image on the display 220. In this embodiment, the touch interaction is a contact operation that the user of the operation terminal 200 contact the display 220 with their finger.

In addition, when the predetermined touch interaction for activating the remote moving app is applied to the display 220, the terminal ECU 290 transmits an app activation signal to the outside of the operation terminal 200. The app activation signal represents information such as an ID for identifying the operation terminal 200.

When the vehicle ECU 90 receives the app activation signal, the vehicle ECU 90 executes a terminal identifying process to determine whether the operation terminal 200 represented by the app activation signal is a registered operation terminal. It should be noted that the registered operation terminal is an operation terminal which has registered in the vehicle ECU 90 as an operation terminal which causes the vehicle ECU 90 to execute the remote moving control.

The operation terminal 200 is the registered operation terminal. Thus, the vehicle ECU 90 determines that the operation terminal 200 is the registered operation terminal by the terminal identifying process. When the vehicle ECU 90 determines so, the vehicle ECU 90 executes the remote moving control in response to the various signals wirelessly transmitted from the operation terminal 200.

<Remote Parking Control>

Further, when the remote moving app has been activated, and a predetermined touch interaction for requesting executing the remote parking control is applied to the display 220, the terminal ECU 290 transmits a remote parking request signal to the outside of the operation terminal 200. The remote parking request signal requests the vehicle ECU 90 to execute the remote parking control.

When the vehicle ECU 90 receives the remote parking request signal, the vehicle ECU 90 executes a braking function confirming process to determine whether the braking apparatus 22 has a malfunction in its braking function for the own vehicle 100. When the vehicle ECU 90 starts the braking function confirming process, the vehicle ECU 90 executes a braking-drive process to control the operations of the braking apparatus 22 so as to apply the braking force to the own vehicle 100 from the braking apparatus 22 and control the operations of the driving apparatus 21 and the transmission apparatus 24 so as to apply the driving force to the own vehicle 100 from the driving apparatus 21.

After the vehicle ECU 90 starts the braking-drive process, the vehicle ECU 90 determines whether the own vehicle 100 is maintained stopped. In this embodiment, the vehicle ECU 90 determines, based on the own vehicle moving speed V, whether the own vehicle 100 is maintained stopped. When the own vehicle moving speed is zero, the vehicle ECU 90 determines that the own vehicle 100 is maintained stopped. On the other hand, when the own vehicle moving speed V is greater than zero, the vehicle ECU 90 determines that the own vehicle 100 is not maintained stopped.

When the vehicle ECU 90 determines that the own vehicle 100 is not maintained stopped before an elapsing time T reaches a predetermined time Tth, the vehicle ECU 90 determines that the braking apparatus 22 has a malfunction in its braking function for the own vehicle 100. The elapsing time T is time which elapses from when the braking-drive process is started.

When the vehicle ECU 90 determines that the braking apparatus 22 has a malfunction in its braking function for the own vehicle 100, the vehicle ECU 90 executes a stopped state holding process and stops the remote parking control. In this embodiment, the stopped state holding process is a process to hold the own vehicle 100 stopped by activating the parking brake apparatus 31 or by controlling the operation of the transmission apparatus 24 so as to set the transmission apparatus 24 in the parking range state SP. Further, when the vehicle ECU 90 stops the remote parking control, the vehicle ECU 90 may wirelessly transmit, to the outside of the own vehicle 100, a signal which represents that the remote parking control is stopped. In this case, the terminal ECU 290 may display, on the display 220, an image which shows that the remote parking control is stopped in response to receiving the signal in question.

On the other hand, when the vehicle ECU 90 has determined that the own vehicle 100 is maintained stopped until the elapsing time T corresponding to the time elapsing from when the braking-drive process is started, reaches the predetermined time Tth, the vehicle ECU 90 determines that the braking apparatus 22 has no malfunction in its braking function for the own vehicle 100.

When the vehicle ECU 90 determines that the braking apparatus 22 has no malfunction in its braking function for the own vehicle 100, the vehicle ECU 90 starts a target moving route setting process. The target moving route setting process of the remote parking control is executed as described below.

Figure 4:
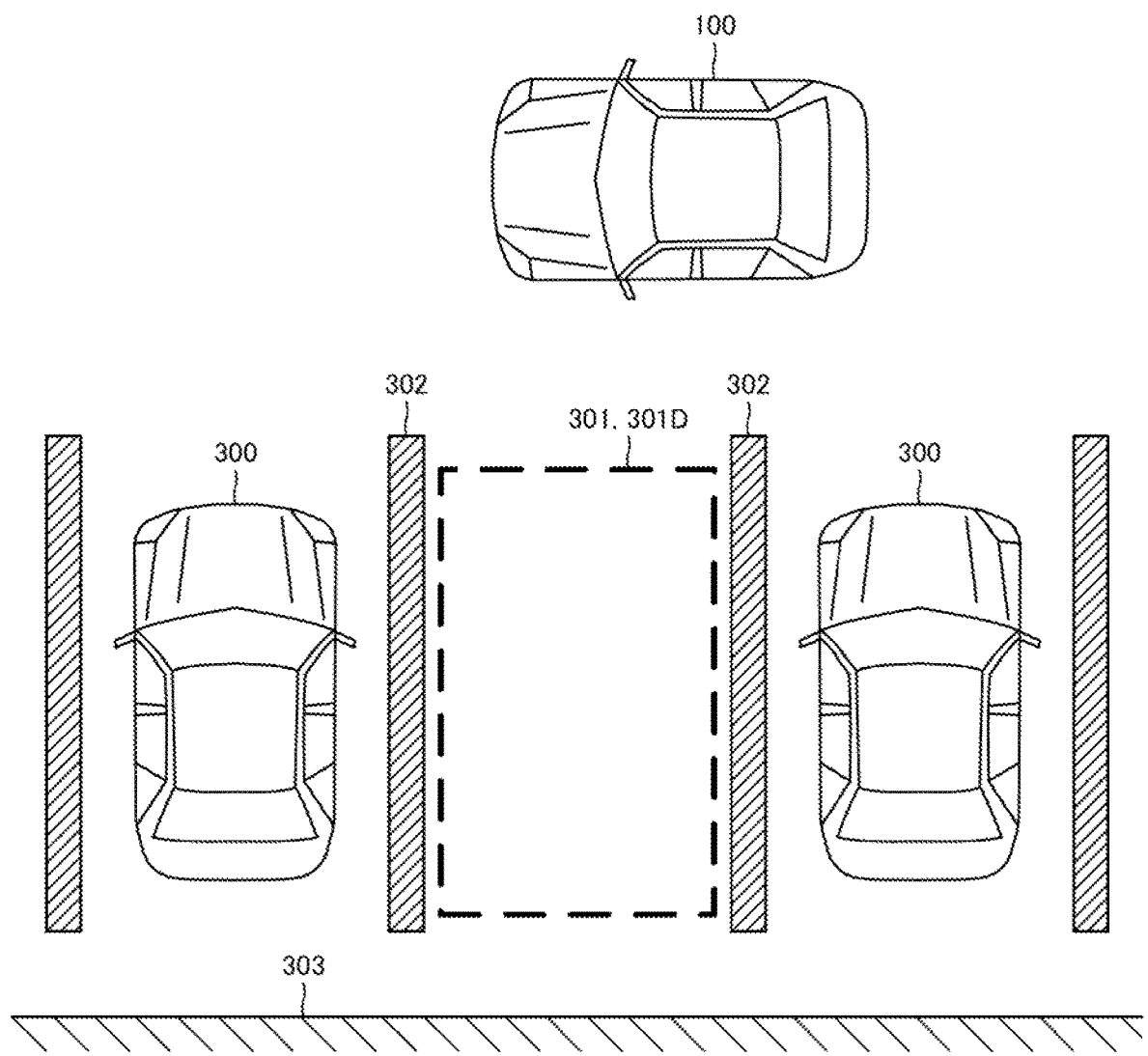
FIG. 4 is a view which shows a scene that the own vehicle stops near a parking space.

For example, as shown in FIG. 4, when (i) the vehicle ECU 90 tries to park the own vehicle 100 in a parking space 301, (ii) the parking space 301 is at the left side of the own vehicle 100, and (iii) the vehicle ECU 90 starts the target moving route setting process, the vehicle ECU 90 recognizes (i) the parking space 301 where the vehicle ECU 90 tries to park the own vehicle 100, (ii) objects such as a wall 303 and next parked vehicles 300 around the own vehicle 100, and (iii) markings 302 provided on a ground around the own vehicle 100, based on the surrounding detection information IS. In this embodiment, the next parked vehicle 300 is a vehicle which is parked in a parking space at the right or left side of the parking space 301 where the vehicle ECU 90 tries to park the own vehicle 100.

Figure 5:
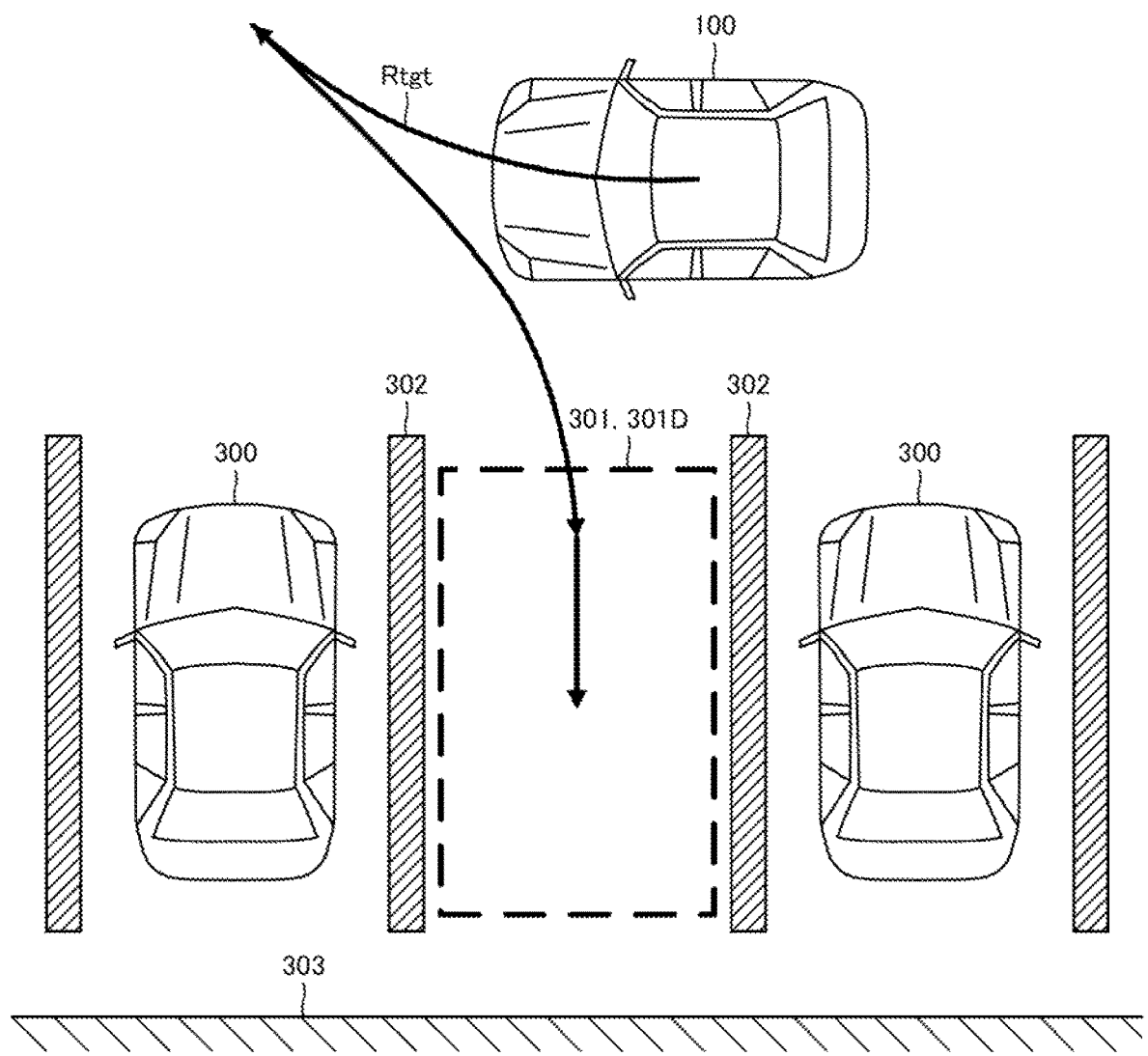
FIG. 5 is a view which shows a target moving route set by the remote parking control.

Then, the vehicle ECU 90 sets the recognized parking space 301 as a designated parking space 301D and as shown in FIG. 5, sets a moving route for parking the own vehicle 100 in the designated parking space 301D as a target moving route Rtgt, based on the designated parking space 301D, the detected objects, and the detected markings 302.

Figure 6:
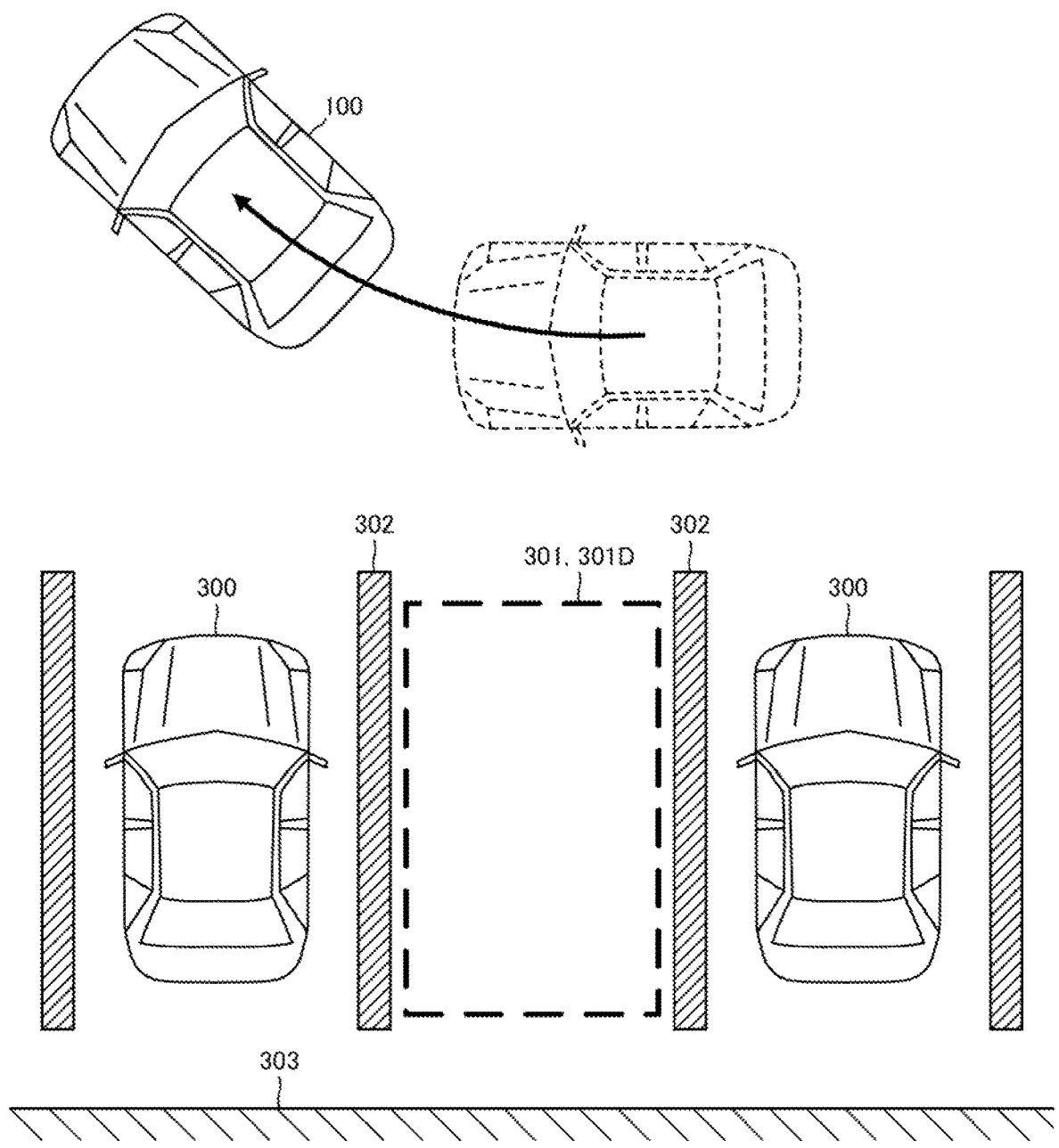
FIG. 6 is a view which shows a scene that the own vehicle is moved forward and turned right by the remote parking control.
Figure 7:
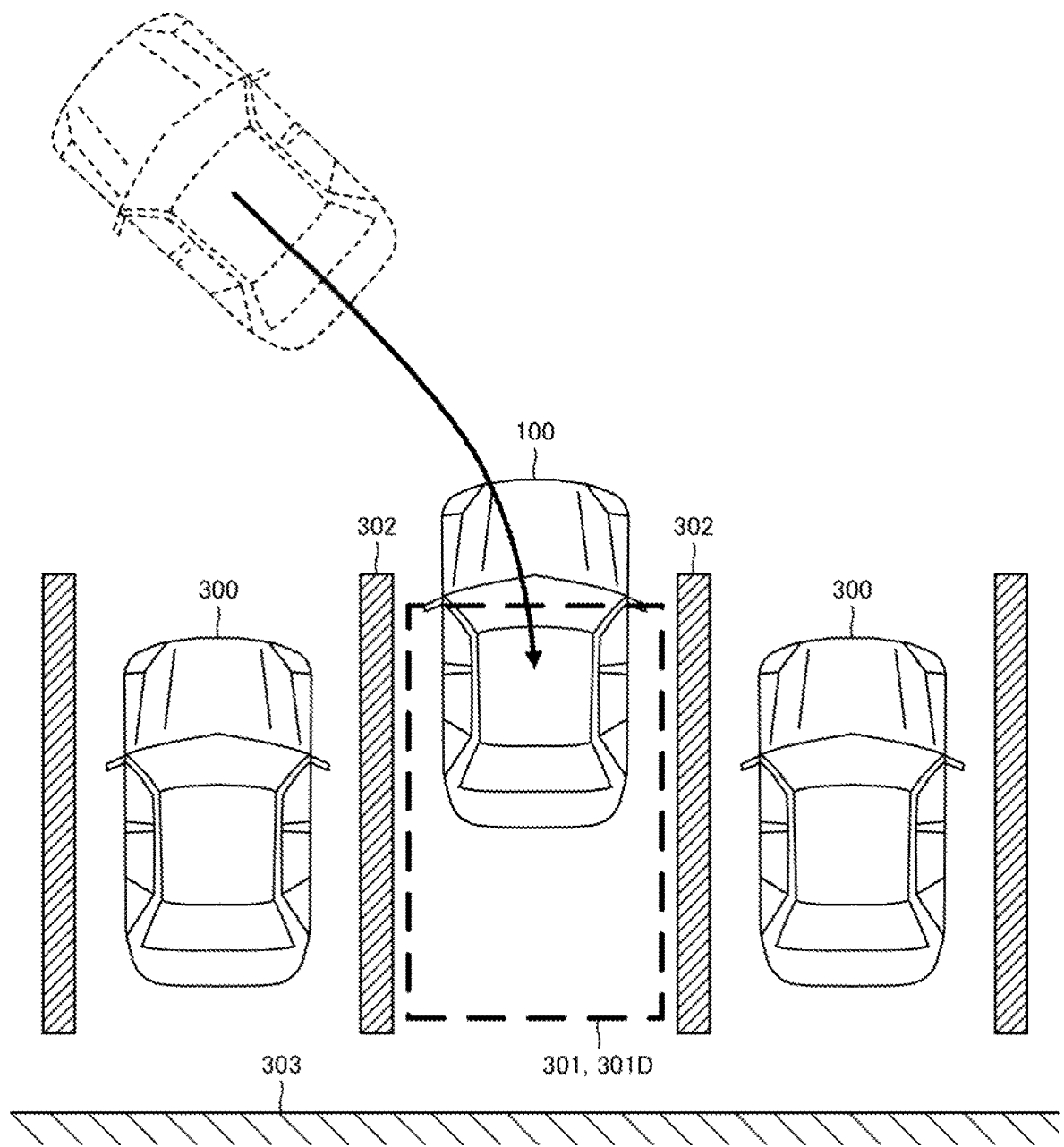
FIG. 7 is a view which shows a scene that the own vehicle is moved rearward and turned left by the remote parking control.
Figure 8:
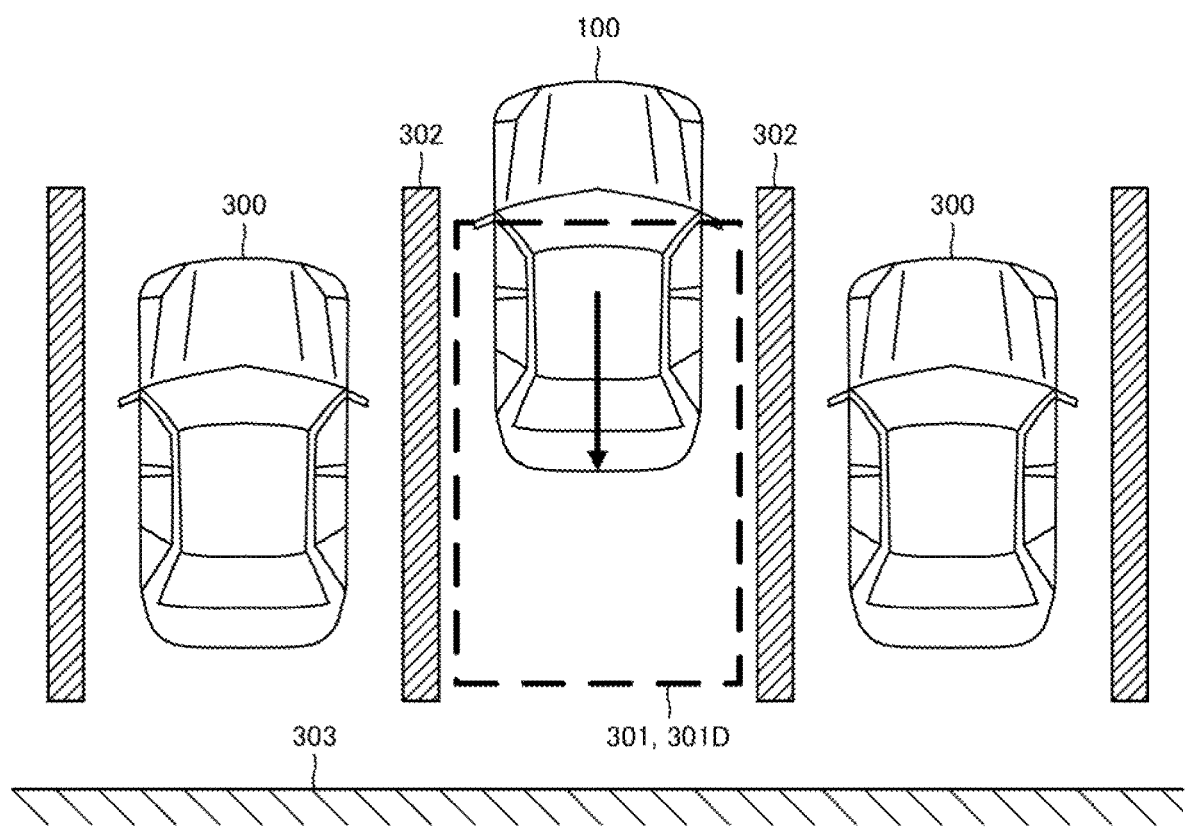
FIG. 8 is a view which shows a scene, that the own vehicle is moved straight rearward by the remote parking control.
Figure 9:
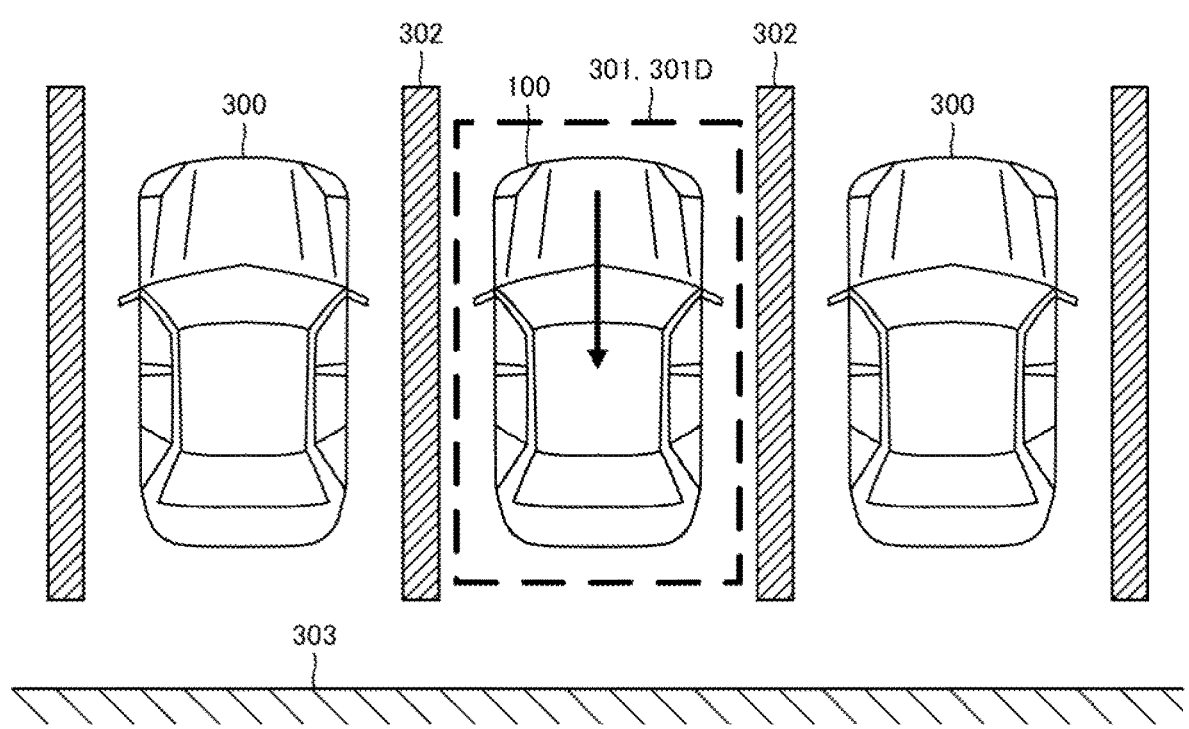
FIG. 9 is a view which shows a scene that parking the own vehicle in a designated parking space by the remote parking control is completed.

When the vehicle ECU 90 sets the target moving route Rtgt, the vehicle ECU 90 starts a parking moving process. When the vehicle ECU 90 starts the parking moving process, the vehicle ECU 90 moves the own vehicle 100 along the target moving route Rtgt by controlling the operations of the vehicle moving apparatus 20 as far as the vehicle ECU 90 receives moving permission signals from the terminal ECU 290. In particular, as shown in FIG. 6, the vehicle ECU 90 moves the own vehicle 100 forward, turning it right. Then, the vehicle ECU 90 stops the own vehicle 100 at a point of time when the own vehicle 100 is moved a predetermined distance. Then, as shown in FIG. 7, the vehicle ECU 90 moves the own vehicle 100 rearward, turning it left and gradually decreasing the steering angle θ. The vehicle ECU 90 steers the own vehicle 100 such that the steering angle θ becomes zero at a point of time when a longitudinal direction of the own vehicle 100 becomes parallel to a longitudinal direction of the designated parking space 301D. Then, as shown in FIG. 8, the vehicle ECU 90 moves the own vehicle 100 rearward straight.

It should be noted that the terminal ECU 290 wirelessly transmits the moving permission signals to the outside thereof while the user continuously applies the predetermined touch interaction to the display 220.

As shown in FICA. 9, when the vehicle ECU 90 completes parking the own vehicle 100 in the designated parking space 301D, the vehicle ECU 90 holds the own vehicle 100 stopped by activating the parking brake apparatus 31 and terminates the remote parking control.

It should be noted that the terminal ECU 290 stops transmitting the moving permission signal to the outside of the operation terminal 200 when the user removes their finger from the display 220 of the operation terminal 200. Thereby, the vehicle ECU 90 does not receive the moving permission signal. When the vehicle ECU 90 does not receive the moving permission signal, the vehicle ECU 90 stops the own vehicle 100 once by controlling the operations of the braking apparatus 22.

<Remote Pulling-Out Control>

Further, when the remote moving app has been activated, and a predetermined touch interaction for requesting executing the remote pulling-out control is applied to the display 220, the terminal ECU 290 transmits a remote pulling-out request signal to the outside of the operation terminal 200. The remote pulling-out request signal requests the vehicle ECU 90 to execute the remote pulling-out control.

When the vehicle ECU 90 receives the remote pulling-out request signal, the vehicle ECU 90 executes the braking function firming process.

When the vehicle ECU 90 determines that the braking apparatus 22 has a malfunction in its braking function for the own vehicle 100 as a result of the braking function confirming process, the vehicle ECU 90 executes the stopped state holding process described above and stops the remote pulling-out control.

On the other hand, when the vehicle ECU 90 determines that the braking apparatus 22 has no malfunction in its braking function for the own vehicle 100, the vehicle ECU 90 starts the target moving route setting process. The target moving route setting process of the remote pulling-out control is executed as described below.

Figure 10:
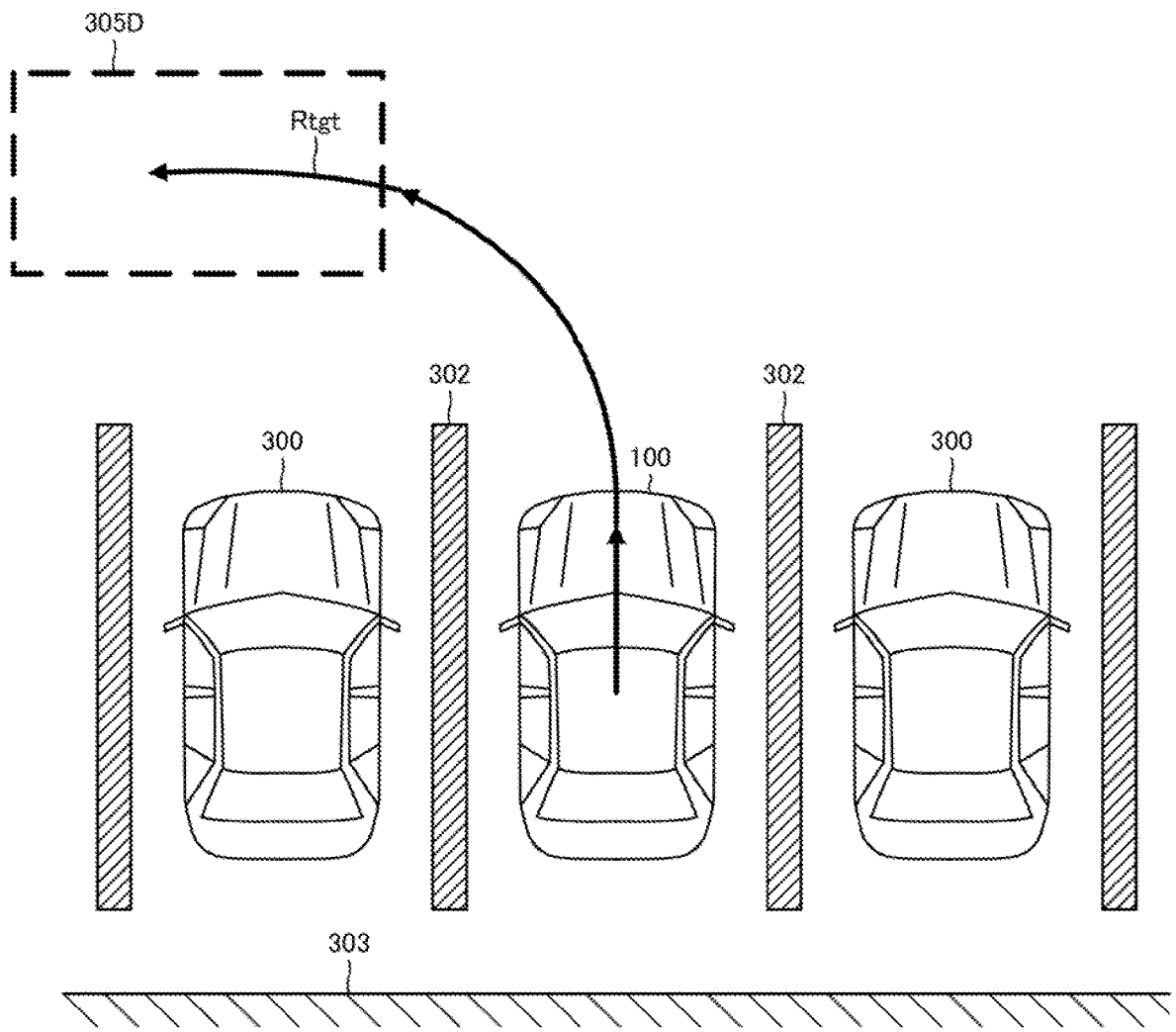
FIG. 10 is a view which shows a target moving route set by a remote pulling-out control.

For example, as shown in FIG. 10, when (i) the own vehicle 100 is parked in the parking space 301, and the (ii) the vehicle ECU 90 starts the target moving route setting process, the vehicle ECU 90 recognizes the objects such as the wall 303 and the next parked vehicles 300 around the own vehicle 100, based on the surrounding detection information IS.

Then, the vehicle ECU 90 sets a moving route for pulling out the own vehicle 100 to a designated pulling-out place 3050 as the target moving route Rtgt, based on the recognized objects.

Figure 11:
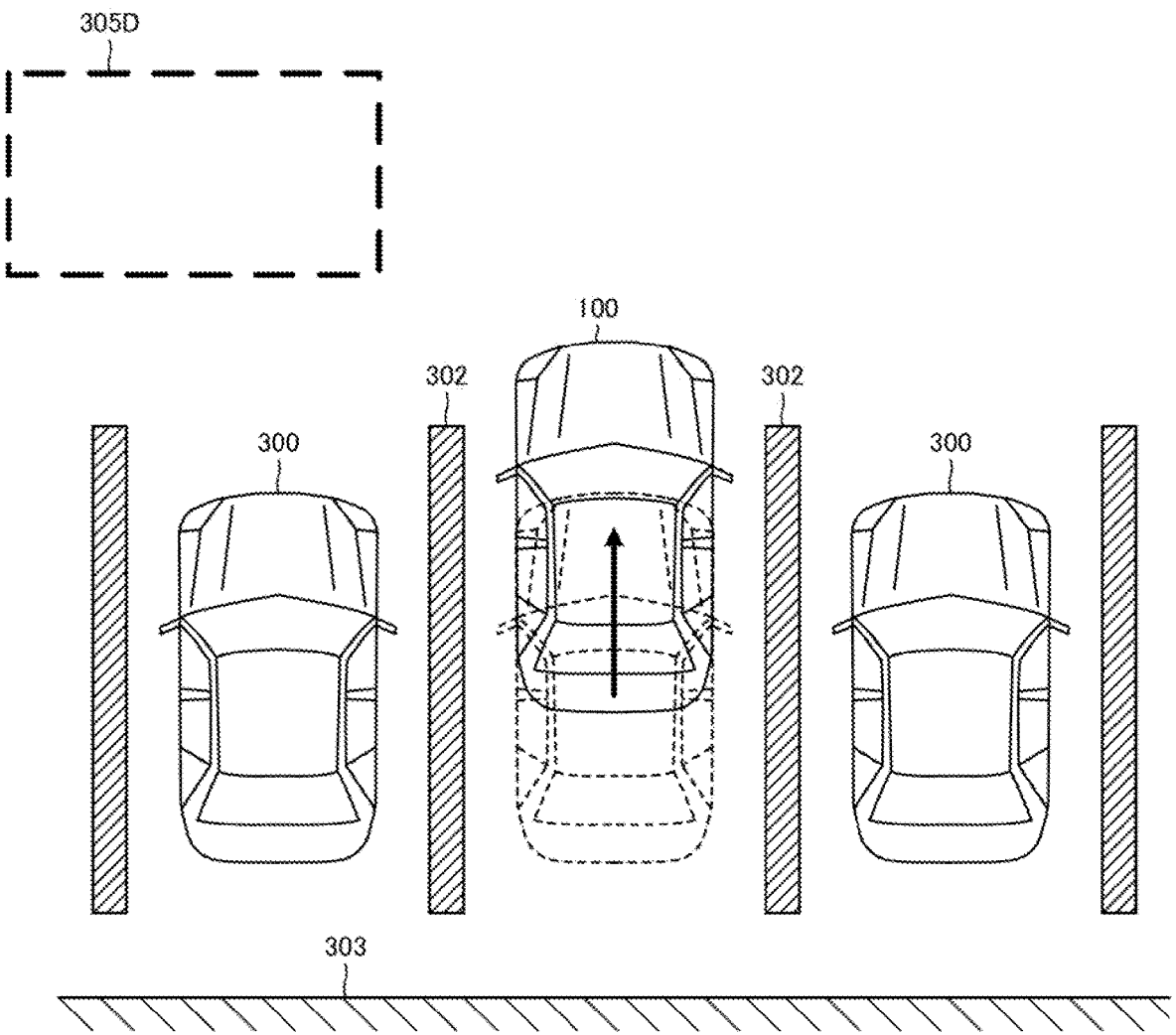
FIG. 11 is a view which shows a scene that the own vehicle is moved straight forward by the remote pulling-out control.
Figure 12:
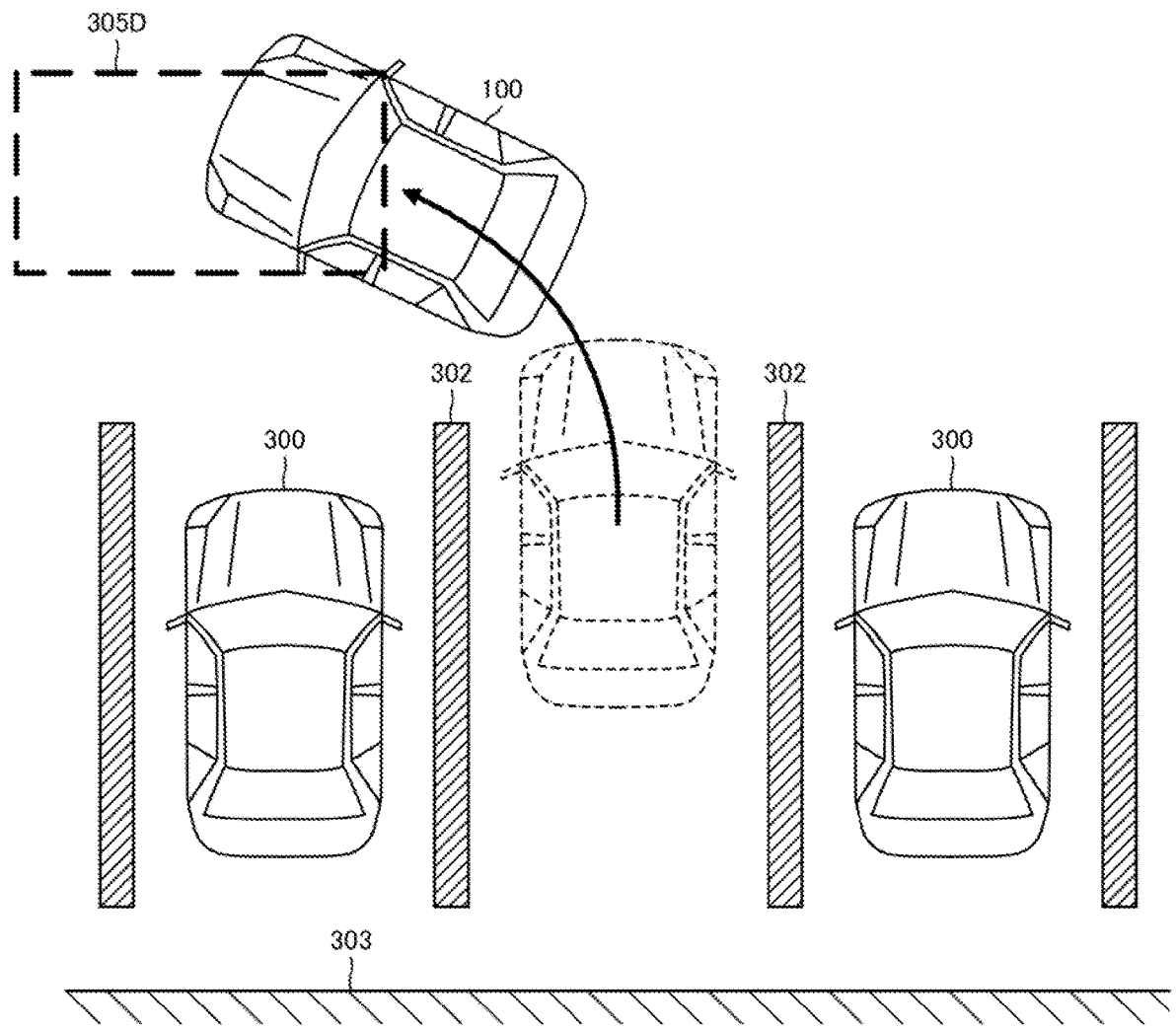
FIG. 12 is a view which shows a scene that the own vehicle is moved forward and turned left by the remote pulling-out control.

When the vehicle ECU 90 sets the target moving route Rtgt, the vehicle ECU 90 starts a pulling-out moving process. When the vehicle ECU 90 starts the pulling-out moving process, the vehicle ECU 90 moves the own vehicle 100 along the target moving route Rtgt by controlling the operations of the vehicle moving apparatus 20 as far as the vehicle ECU 90 receives the moving permission signals from the terminal ECU 290. In particular, as shown in FIG. 11, the vehicle ECU 90 moves the own vehicle 100 straight forward. Then, as shown in FIG. 12, the vehicle ECU 90 moves the own vehicle 100 forward, turning it left and gradually decreasing the steering angle θ. The vehicle ECU 90 steers the own vehicle 100 such that the steering angle θ becomes zero at a point of time when the longitudinal direction of the own vehicle 100 becomes parallel to a lateral direction of the parking space 301.

Figure 13:
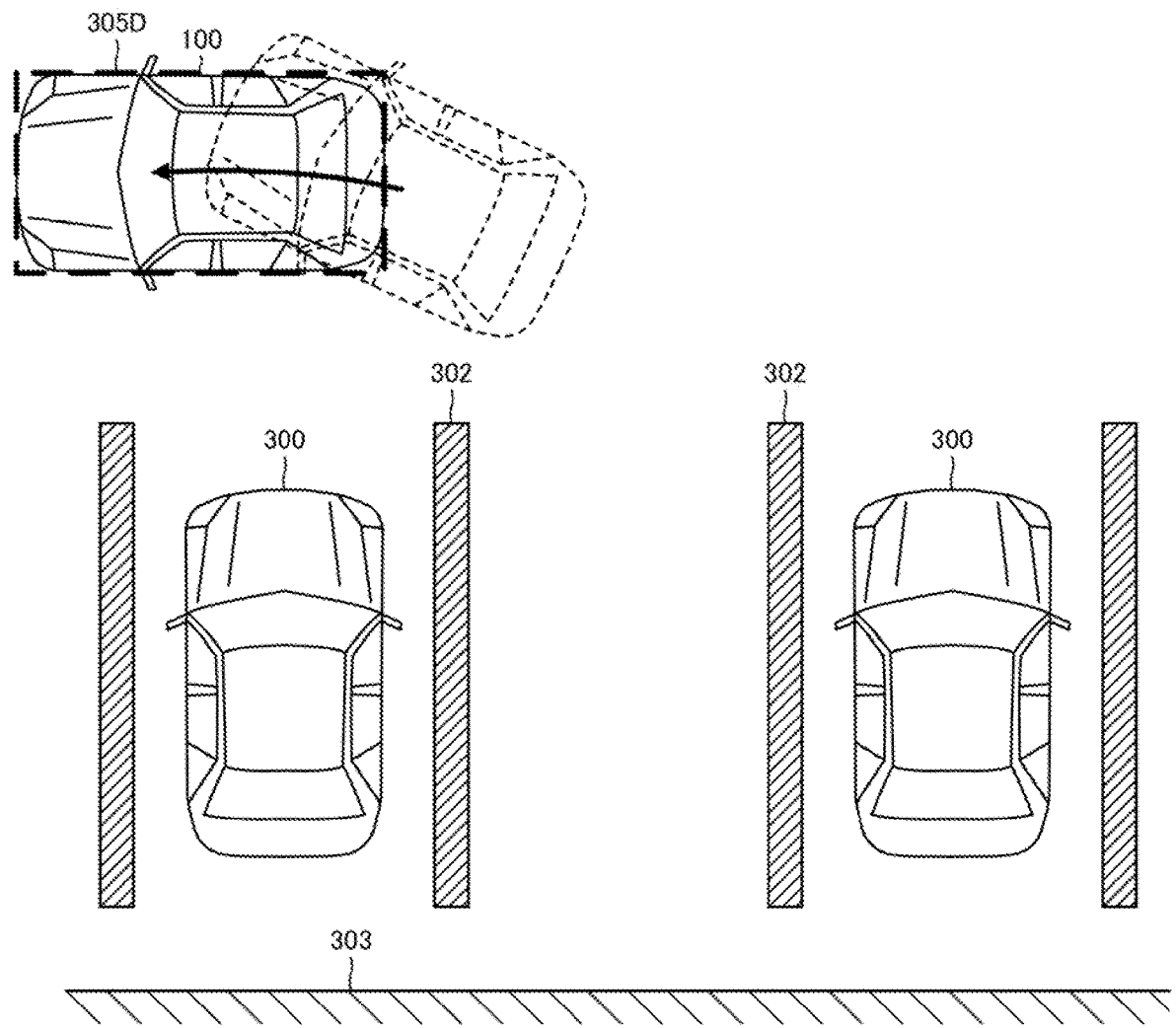
FIG. 13 is a view which shows a scene that pulling out the own vehicle to a designated pulling-out place by the remote pulling-out control is completed.

As shown in FIG. 13, when the vehicle ECU 90 completes pulling out the own vehicle 100 to the designated pulling-out place 3050, the vehicle ECU 90 holds the own vehicle 100 stopped by activating the parking brake apparatus 31 and terminates the remote pulling-out control.

The summary of the operations of e remote parking apparatus 10 has been described.

With the remote parking apparatus 10, on the condition that the own vehicle 100 has been maintained stopped for the predetermined time Tth after the braking-drive process starts to be executed, the own vehicle 100 starts to be moved by the remote parking control. In other words, on the condition that the own vehicle 100 has been maintained stopped even when the braking-drive process is executed, the braking apparatus 22 is determined to have no malfunction in its braking function for the own vehicle 100, and the own vehicle 100 starts to be moved by the remote parking control, Thus, with the remote parking apparatus 10, whether the braking apparatus 22 has a malfunction in its braking function due to a malfunction of an electric system necessary to activate the braking apparatus 22 can be determined. In addition, with the remote parking apparatus 10, when the braking apparatus 22 has components such as the brake pads, whether the braking apparatus 22 has a malfunction m its braking function due to wearing of the brake pads which is difficult to detect can be determined. In addition, with the remote parking apparatus 10, whether the braking apparatus 22 has a malfunction in its braking function due to an overcharge of the own vehicle 100 can be determined. Thus, the braking apparatus 22 can be surely determined to have no malfunction in its braking function before the own vehicle 100 starts to be moved by the remote parking control.

Similarly, with the remote parking apparatus 10, on the condition that the own vehicle 100 has been maintained stopped for the predetermined time Tth even when the braking-drive process is executed, the own vehicle 100 starts to be moved by the remote pulling-out control. Thus, the braking apparatus 22 can be surely determined to have no malfunction in its braking function before the own vehicle 104 starts to be moved by the remote pulling-out control,
<Specific Operations of Remote Parking Apparatus>

Next, specific operations of the remote parking apparatus 10 will be described. The vehicle CPU 91 of the vehicle ECU 90 of the remote parking apparatus 10 is configured or programmed to execute a routine shown in FIG. 14 with a predetermined calculation cycle, Thus, at a predetermined time, the vehicle CPU 91 starts a process from a step 1400 of the routine shown in FIG. 14 and proceeds with the process to a step 1405 to determine a value of a remote parking request flag Xpark is "1". The remote parking request flag Xpark represents whether the remote parking control is requested to be executed. When the remote parking control is requested to be executed, the value of the remote parking request flag Xpark is set to "1". On the other hand, when the remote parking control is not requested to be executed, the value of the remote parking request flag Xpark is set to "0".

Figure 15:
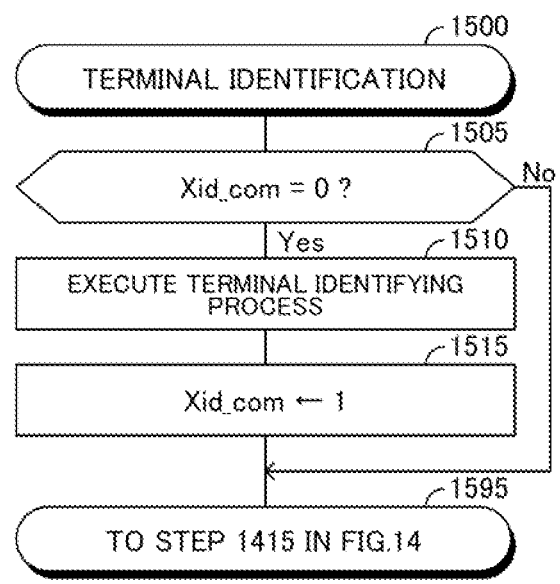
FIG. 15 is a view which shows a flowchart of a routine executed by the remote parking apparatus according to the embodiment of the invention.

When the vehicle CPU 91 determines "Yes" at the step 1405, the vehicle CPU 91 proceeds with the process to a step 1410 to execute a routine shown in FIG. 15. Thus, when the vehicle CPU 91 proceeds with the process to the step 1410, the vehicle CPU 91 starts a process from a step 1500 of the routine shown in FIG. 15 and proceeds with the process to a step 1505 to determine whether a value of a terminal identification complete flag Xid_com is "0". The terminal identification complete flag Xid_com represents whether a determination f identifying the operation terminal is completed. The determination of identifying the operation terminal is a determination of whether the operation terminal transmitting the signal requesting executing the remote parking control is the registered operation terminal. When the determination of identifying the operation terminal is completed, the value of the terminal identification complete flag Xid_com is set to "1". On the other hand, when the determination of identifying the operation terminal is not completed, the value of the terminal identification complete flag Xid_com is set to "0".

When the vehicle CPU 91 determines "Yes" at the step 1505, the vehicle CPU 91 proceeds with the process to a step 1510 to execute the terminal identifying process. Next, the vehicle CPU 91 proceeds with the process to a step 1515 to set the value of the terminal identification complete flag Xid_com to "1". Then, the vehicle CPU 91 proceeds with the process to a step 1415 of the routine shown in FIG. 14 via a step 1595.

Figure 14:
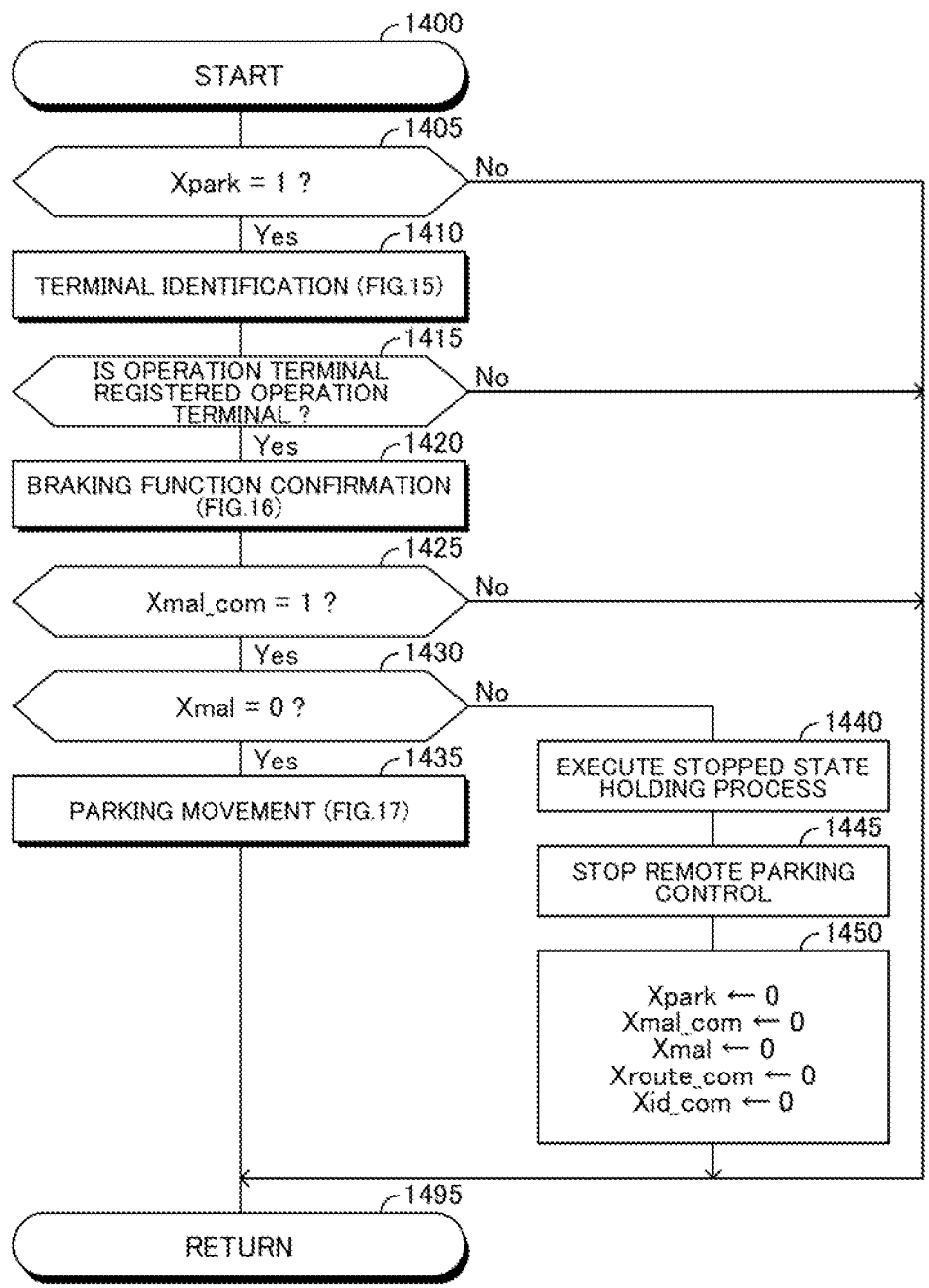
FIG. 14 is a view which shows a flowchart of a routine executed by the remote parking apparatus according to the embodiment of the invention.

On the other hand, when the vehicle CPU 91 determines "No" at the step 1505, the vehicle CPU 91 proceeds with the process directly to the step 1415 of routine shown in FIG. 14 via the step 1595.

When the vehicle CPU 91 proceeds with the process to the step 1415 of the routine shown in FIG. 14, the vehicle CPU 91 determines whether the terminal operation transmitting the signal to request executing the remote parking control is the registered operation terminal.

Figure 16:
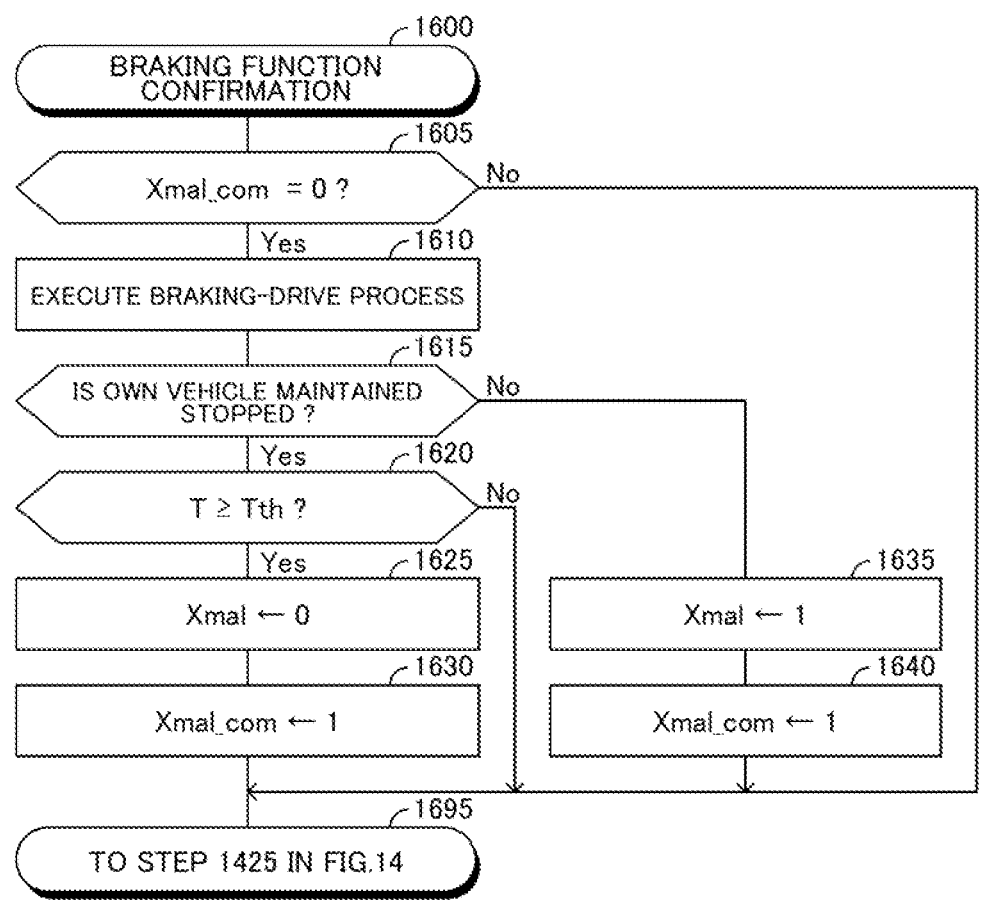
FIG. 16 is a view which shows a flowchart of a routine executed by the remote parking apparatus according to the embodiment of the invention.

When the vehicle CPU 91 determines "Yes" at the step 1415, the vehicle CPU 91 proceeds with the process to a step 1420 to execute a routine shown in FIG. 16. Thus, when the vehicle CPU 91 proceeds with the process to the step 1420, the vehicle CPU 91 starts a process from a step 1600 and proceeds with the process to a step 1605 to determine whether a value of a braking function confirmation complete flag Xmal_com is "0". The braking function confirmation complete flag Xmal_com represents whether a determination of confirming the braking function is completed. The determination of confirming, the braking function is a determination of whether the braking apparatus 22 has a malfunction in its braking function for the own vehicle 100. When the determination of confirming the braking function is completed, the value of the braking function confirmation complete flag Xmal_com is set to "1". On the other hand, when the determination of confirming the braking function is not completed, the value of the braking function confirmation complete flag Xmal_com is set to "0".

When the vehicle CPU 91 determines "Yes" at the step 1605, the vehicle CPU 91 proceeds with the process to a step 1610 to execute the braking-drive process. Next, the vehicle CPU 91 proceeds with the process to a step 1615 to determine whether the own vehicle 100 is maintained stopped.

When the vehicle CPU 91 determines "Yes" at the step 1615, the vehicle CPU 91 proceeds with the process to a step 1620 to determine whether the elapsing time T elapsing from when the braking-drive process starts to be executed is equal to or greater than the predetermined time Tth.

When the vehicle CPU 91 determines "Yes" at the step 1620, the vehicle CPU 91 proceeds with the process to a step 1625 to set the value of the braking function malfunction flag Xmal is "0". The braking function malfunction flag Xmal represents whether the braking apparatus 22 has a malfunction in its braking function for the own vehicle 100. When the braking apparatus 22 has a malfunction in its braking function for the own vehicle 100, the value of the braking function malfunction flag Xmal is set to "1". On the other hand, when the braking apparatus 22 has no malfunction in its braking function for the own vehicle 100, the value of the braking function malfunction flag Xmal is set to "0".

Next, the vehicle CPU 91 proceeds with the process to a step 1530 to set the value of the braking function confirmation complete flag Xmal_com to "1". Next, the vehicle CPU 91 proceeds with the process to a step 1425 of the routine shown in FIG. 14 via a step 1695.

On the other hand, when the vehicle CPU 91 determines "No" at the step 1620, the vehicle CPU 91 proceeds with the process directly to the step 1425 of the routine shown in FIG. 14 via the step 1695.

Further, when the vehicle CPU 91 determines "No" at the step 1615, the vehicle CPU 91 proceeds with the process to a step 1635 to set the value of the braking function malfunction flag Xmal to "1". Next, the vehicle CPU 91 proceeds with the process to a step 1640 to set the value of the braking function confirmation complete flag Xmal_com to "1". Next, the vehicle CPU 91 proceeds with the process to the step 1425 of the routine shown in FIG. 14 via the step 1695.

Furthermore, when the vehicle CPU 91 determines "No" at the step 1605, the vehicle CPU 91 proceeds with the process directly to the step 1425 of the routine shown in FIG. 14 via the step 1695.

When the vehicle CPU 91 proceeds with the process to the step 1425 of the routine shown in FIG. 14, the vehicle CPU 91 determines whether the value of the braking function confirmation complete flag Xmal_com is "1".

When the vehicle CPU 91 determines "Yes" at the step 1425, the vehicle CPU 91 proceeds with the process to a step 1430 to determine whether the value of the braking function malfunction flag Xmal is "0".

Figure 17:
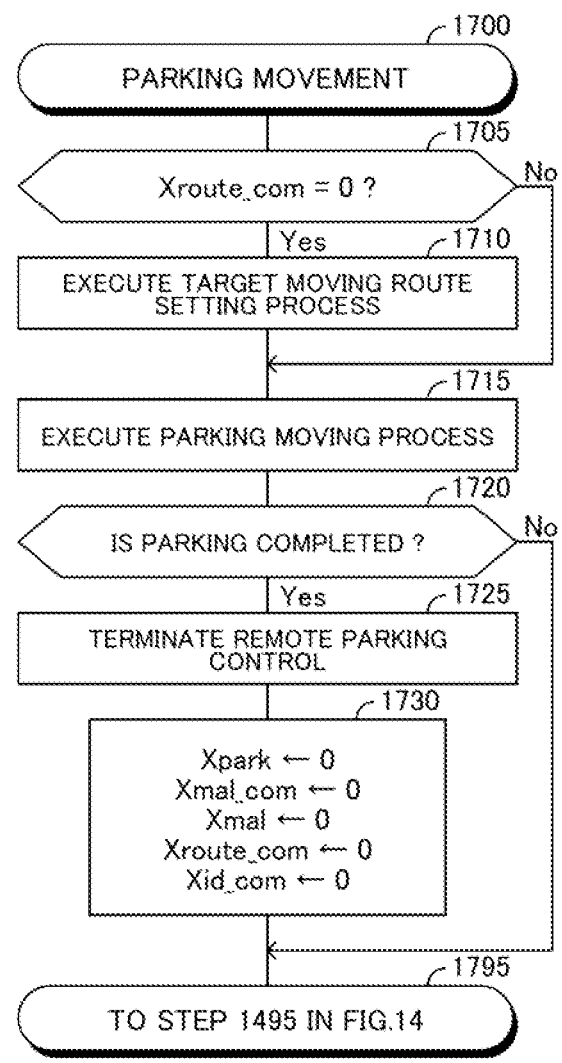
FIG. 17 is a view which shows a flowchart of a routine executed by the remote parking apparatus according to the embodiment of the invention.

When the vehicle CPU 91 determines "Yes" at the step 1430, the vehicle CPU 91 proceeds with the process to a step 1435 to execute a routine shown in FIG. 17. Thus, when the vehicle CPU 91 proceeds with the process to the step 1435, the vehicle CPU 91 starts process from a step 1700 of the routine shown in FIG. 17 and proceeds with the process to a step 1705 to determine whether a value of a target moving route setting complete flag Xroute_com is "0". The target moving route setting complete flag Xroute_com represents whether setting the target moving route Rtgt used in the remote parking control is completed. When setting the target moving route Rtgt used in the remote parking control is completed, the value of the target moving route setting complete flag Xroute_com is set to "1". On the other hand, when setting the target moving route Rtgt used in the remote parking control is not completed, the value of the target moving route setting complete flag Xroute_com is set to "0".

When the vehicle CPU 91 determines "Yes" at the step 1705, the vehicle CPU 91 proceeds with the process to a step 1710 to execute the target moving route setting process to set the target moving route Rtgt. Next, the vehicle CPU 91 proceeds with the process to a step 1715.

On the other hand, when the vehicle CPU 91 determines "No" at the step 1705, the vehicle CPU 91 proceeds with the process directly to the step 1715.

When the vehicle CPU 91 proceeds with the process to the step 1715, the vehicle CPU 91 executes the parking moving process. Next, the vehicle CPU 91 proceeds with the process to a step 1720 to determine whether parking the own vehicle 100 in the designated parking space 3010 is completed.

When the vehicle CPU 91 determines "Yes" at the step 1720, the vehicle CPU 91 proceeds with the process to a step 1725 to terminate the remote parking control. Next, the vehicle CPU 91 proceeds with the process to a step 1730 to set the values of the remote parking request flag Xpark, the braking function confirmation complete flag Xmal_com, the braking function malfunction flag Xmal, the target moving route setting complete flag Xroute_com, and the terminal identification complete flag Xid_com to "0", respectively. Next, the vehicle CPU 91 proceeds with the process to a step 1495 of the routine shown FIG. 14 via a step 1795 to terminate executing this routine once.

On the other hand, when the vehicle CPU 91 determines "No" at the step 1720, the vehicle CPU 91 proceeds with the process directly to the step 1495 of the routine shown in FIG. 14 via the step 1795 to terminate executing this routine once. In this case, the parking moving process continues to be executed.

Further, when the vehicle CPU 91 determines "No" at the step 1430 of the routine shown in FIG. 14, the vehicle CPU 91 proceeds with the process to a step 1440 to execute the stopped state holding process. Next, the vehicle CPU 91 proceeds with the process to a step 1445 to stop the remote parking control. Next, the vehicle CPU 91 proceeds with the process to a step 1450 to set the values of the remote parking request flag Xpark, the braking function confirmation complete flag Xmal_com, the braking function malfunction flag Xmal, the target moving route setting complete flag Xroute_com, and the terminal identification complete flag Xid_com to "0", respectively. Next, the vehicle CPU 91 proceeds with the process to the step 1495 to terminate executing this routine c rice.

Further, when the vehicle CPU 91 determines "No" at the step 1405, 1415, or 1425, the vehicle CPU 91 proceeds with the process to the step 1495 to terminate executing this routine once.

Figure 18:
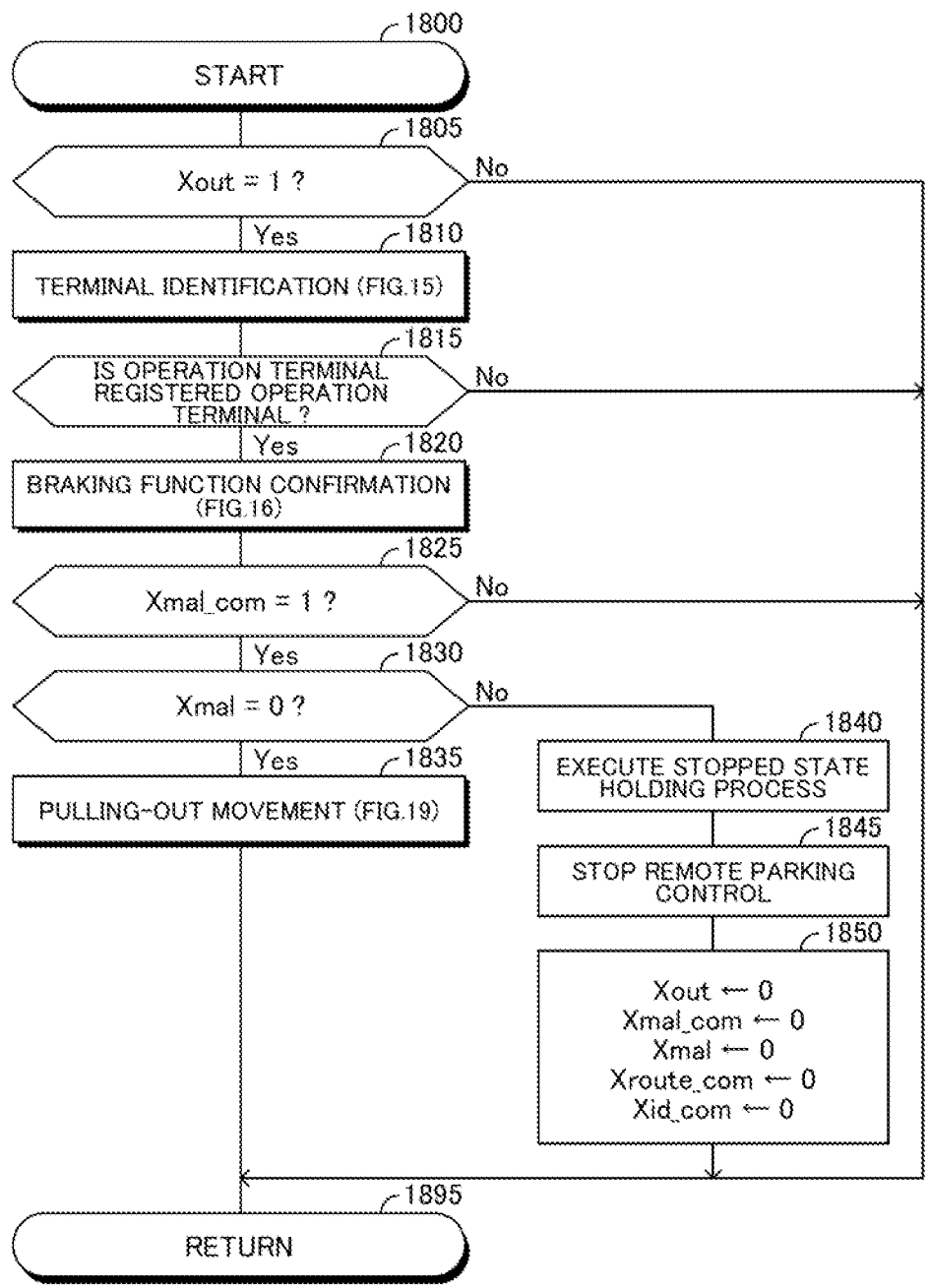
FIG. 18 is a view which shows a flowchart of a routine executed by the remote parking apparatus according to the embodiment of the invention.

In addition, the vehicle CPU 91 is configured or programmed to execute a routine shown in FIG. 18 with the predetermined calculation cycle. Thus, at a predetermined time, the vehicle CPU 91 starts a process from a step 1800 of the routine shown in FIG. 18 and proceeds with the process to a step 1805 to determine a value of a remote pulling-out request flag Xout is "1". The remote pulling-out request flag Xout represents whether the remote pulling-out control is requested to be executed. When the remote pulling-out control is requested to be executed, the value of the remote out request flag Xout is set to "1". On the other hand, when the remote pulling-out control is not requested to be executed, the value of the remote pulling-out request flag Xout is set to "0".

When the vehicle CPU 91 determines "Yes" at the step 1805, the vehicle CPU 91 proceeds with the process to a step 1810 to execute the routine shown in FIG. 15. It should be noted that the vehicle CPU 91 determines at the step 1505 whether the value of the terminal identification complete flag Xid_com is "0". In this case, the terminal identification complete flag Xid_com represents whether the determination of identifying the operation terminal is completed. In this case, the determination of identifying the operation terminal is a determination of whether the operation terminal transmitting the signal requesting executing the remote pulling-out control is the registered operation terminal. When the determination of identifying the operation terminal is completed, the value of the terminal identification complete flag Xid_com is set to "1". On the other hand, when the determination of identifying the operation terminal is not completed, the value of the terminal identification complete flag Xid_com is set to "0".

After the vehicle CPU 91 executes the process of the step 1810, the vehicle CPU 91 proceeds with the process to a step 1815 to determine whether the terminal operation transmitting the signal to request executing the remote pulling-out control is the registered operation terminal.

When the vehicle CPU 91 determines "Yes" at the step 1815, the vehicle CPU 91 proceeds with the process to a step 1820 to execute the routine shown in FIG. 16.

After the vehicle CPU 91 executes the process of the step 1820, the vehicle CPU 91 proceeds with the process to a step 1825 to determine whether the value of the braking function confirmation complete flag Xmal_com is "1".

When the vehicle CPU 91 determines "Yes" at the step 1825, the vehicle CPU 91 proceeds with the process to a step 1830 to determine whether the value of the braking function malfunction flag Xmal is "0".

Figure 19:
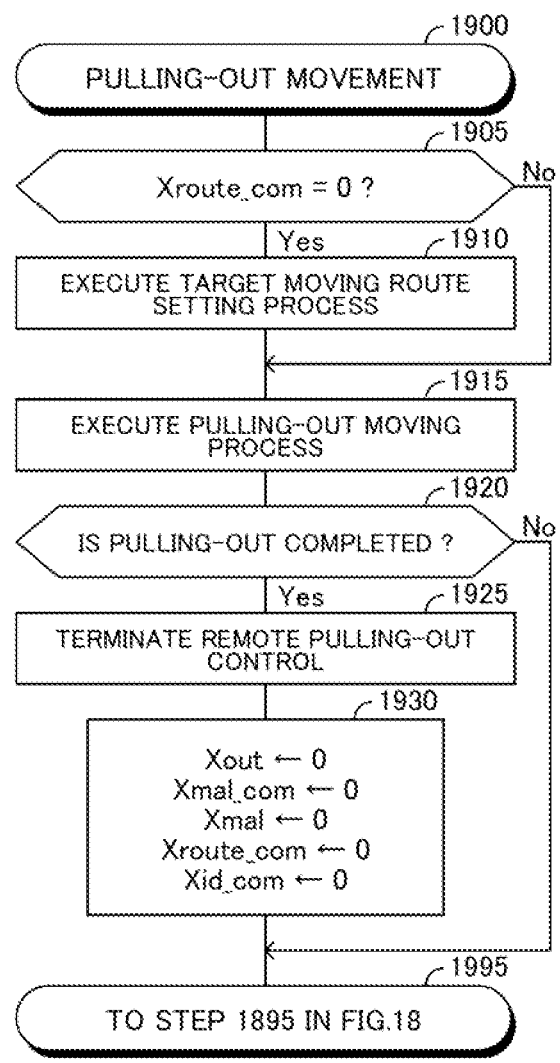
FIG. 19 is a view which shows a flowchart of a routine executed by the remote parking apparatus according to the embodiment of the invention.

When the vehicle CPU 91 determines "Yes" at the step 1830, the vehicle CPU 91 proceeds with the process to a step 1835 to execute a routine shown in FIG. 19. Thus, when the vehicle CPU 91 proceeds with the process to the step 1835, the vehicle CPU 91 starts a process from a step 1900 of the routine shown in FIG. 19 and proceeds with the process to a step 1905 to determine whether the value of the target moving route setting complete flag Xroute_com is "0". In this case, the target moving route setting complete flag Xroute_com represents whether setting the target moving route Rtgt used in the remote pulling-out control is completed. When setting the target moving route Rtgt used in the remote pulling-out control is completed, the value of the target moving route setting complete flag Xroute_com is set to "1". On the other hand, when setting the target moving route Rtgt used in the remote pulling-out control is not completed, the value of the target moving route setting complete flag Xroute_com is set to "0".

When the vehicle CPU 91 determines "Yes" at the step 1905, the vesicle CPU 91 proceeds with the process to a step 1910 to execute the target moving route setting process to set the target moving route Rtgt. Next, the vehicle CPU 91 proceeds with the process to a step 1915.

On the other hand, when the vehicle CPU 91 determines "No" at the step 1905, the vehicle CPU 91 proceeds with the process directly to the step 1915.

When the vehicle CPU 91 proceeds with the process to the step 1915, the vehicle CPU 91 executes the pulling-out moving process. Next, the vehicle CPU 91 proceeds with the process to a step 1920 to determine whether pulling out the own vehicle 100 to the designated pulling-out place 305D is completed.

When the vehicle CPU 91 determines "Yes" at the step 1920, the vehicle CPU 91 proceeds with the process to a step 1925 to terminate the remote pulling-out control. Next, the vehicle CPU 91 proceeds with the process to a step 1930 to set the values of the remote pulling-out request flag Xout, the braking function confirmation complete flag Xmal_com, the braking function malfunction flag Xmal, the target moving route setting complete flag Xroute_com, and the terminal identification complete flag Xid_com to "0", respectively. Next, the vehicle CPU 91 proceeds with the process to a step 1895 of the routine shown in FIG. 18 via a step 1995 to terminate executing this routine once.

On the other hand, when the vehicle CPU 91 determines "No" at the step 1920, the vehicle CPU 91 proceeds with the process directly to the step 1895 of the routine shown in FIG. 18 via the step 1995 to terminate executing this routine once. In this case, the pulling out moving process continues to be executed.

Further, when the vehicle CPU 91 determines "No" at the step 1830 of the routine shown in FIG. 18, the vehicle CPU 91 proceeds with the process to a step 1840 to execute the stopped state holding process. Next, the vehicle CPU 91 proceeds with the process to a step 1845 to stop the remote pulling-out control. Next, the vehicle CPU 91 proceeds with the process to a step 1850 to set the values of the remote pulling-out request flag Xout, the braking function confirmation complete flag Xmal_com, the braking function malfunction flag Xmal, the target moving route setting complete flag Xroute_com, and the terminal identification complete flag Xid_com to "0", respectively. Next, the vehicle CPU 91 proceeds with the process to the step 1895 to terminate executing this routine once.

Further, when the vehicle CPU 91 determines "No" at the step 1805, 1815, or 1825, the vehicle CPU 91 proceeds with the process to the step 1895 to terminate executing this routine once.

The specific operations of the remote parking apparatus 10 have been described.

It should be noted that the invention is not limited to the aforementioned embodiments, and various modifications can be employed within the scope of the invention.

What is claimed is:

1. A remote parking apparatus comprising:
    a driving apparatus which applies a driving force to an own vehicle to move the own vehicle;
    a braking apparatus which applies a braking force to the own vehicle to brake the own vehicle; and
    a vehicle electronic control unit which is configured to execute a remote parking control to park the own vehicle in a designated parking space by controlling operations of the driving apparatus and the braking apparatus in response to commands from outside of the own vehicle,
    wherein the vehicle electronic control unit is configured to:
        before the vehicle electronic control unit starts to move the own vehicle by the remote parking control, execute a braking-drive process to apply the braking force to the own vehicle by the braking apparatus and apply the driving force to the own vehicle by the driving apparatus; and
        on the condition that the own vehicle is maintained stopped until a predetermined time elapses from starting the braking-drive process, start to move the own vehicle by the remote parking control.

2. The remote parking apparatus as set forth in claim 1, wherein the remote parking apparatus comprises a vehicle stopped state holding apparatus which holds the own vehicle stopped, and
    wherein the vehicle electronic control unit is configured to, on the condition that the own vehicle is not maintained stopped and moves before the predetermined time elapses from starting the braking-drive process, hold the own vehicle stopped by the vehicle stopped state holding apparatus.

3. The remote parking apparatus as set forth in claim 1, further comprising a steering apparatus which applies a steering force to the own vehicle to steer the own vehicle,
    wherein the vehicle electronic control unit is configured to execute the remote parking control to park the own vehicle in the designated parking space by controlling operations of the steering apparatus, in response to commands from outside of the own vehicle, in order to steer the vehicle into the designated parking space.

4. The remote parking apparatus as set forth in claim 3, based upon the own vehicle completing parking in the designated parking space using the remote parking control, the vehicle electronic control unit is further configured to terminate the remote parking control.

5. The remote parking apparatus as set forth in claim 1, further comprising a camera which obtains surroundings information,
    wherein, based upon the condition that the own vehicle is maintained stopped until the predetermined time elapses from starting the braking-drive process, and before starting to move the own vehicle by the remote parking control, the vehicle electronic control unit is further configured to set a target moving route based on surroundings information, and move the own vehicle by the remote parking control along the target moving route.

6. The remote parking apparatus as set forth in claim 5, wherein the vehicle electronic control unit is configured to execute the remote parking control to park the own vehicle in the designated parking space by controlling operations of a steering apparatus, in response to commands from outside of the own vehicle, in order to steer the vehicle along the target moving route into the designated parking space.

7. The remote parking apparatus as set forth in claim 5, based upon the own vehicle completing parking in the designated parking space using the remote parking control, the vehicle electronic control unit is further configured to terminate the remote parking control.

8. The remote parking apparatus as set forth in claim 6, based upon the own vehicle completing parking in the designated parking space using the remote parking control, the vehicle electronic control unit is further configured to terminate the remote parking control.

* * * * *